United States Patent
Zhang et al.

(10) Patent No.: US 11,765,620 B2
(45) Date of Patent: Sep. 19, 2023

(54) INTEGRATED ACCESS AND BACKHAUL NODE TECHNIQUES FOR UNLICENSED OPERATIONS

(71) Applicant: QUALCOMM Incorporated, San Diego, CA (US)

(72) Inventors: Xiaoxia Zhang, San Diego, CA (US); Jing Sun, San Diego, CA (US); Jianghong Luo, Skillman, NJ (US); Tao Luo, San Diego, CA (US); Navid Abedini, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 17/092,189

(22) Filed: Nov. 6, 2020

(65) Prior Publication Data
US 2022/0150757 A1    May 12, 2022

(51) Int. Cl.
| | |
|---|---|
| *H04W 72/0446* | (2023.01) |
| *H04W 72/1263* | (2023.01) |
| *H04W 76/15* | (2018.01) |
| *H04W 28/086* | (2023.01) |

(52) U.S. Cl.
CPC ... *H04W 28/0815* (2020.05); *H04W 72/0446* (2013.01); *H04W 72/1263* (2013.01); *H04W 76/15* (2018.02)

(58) Field of Classification Search
CPC ............. H04W 28/0815; H04W 76/15; H04W 72/0446; H04W 72/1263
USPC .......................................................... 370/329
See application file for complete search history.

(56) References Cited

U.S. PATENT DOCUMENTS

| | | | | |
|---|---|---|---|---|
| 2021/0345225 | A1* | 11/2021 | Novlan | H04W 8/24 |
| 2022/0015143 | A1* | 1/2022 | Tiirola | H04B 7/15 |
| 2022/0353830 | A1* | 11/2022 | Park | H04W 84/04 |

FOREIGN PATENT DOCUMENTS

| | | | | |
|---|---|---|---|---|
| WO | WO-2020065039 A1 * | 4/2020 | ......... | H04B 7/15542 |
| WO | WO-2020181287 A1 * | 9/2020 | ......... | H04W 74/002 |
| WO | WO-2021009665 A1 * | 1/2021 | | |
| WO | WO-2021023623 A1 * | 2/2021 | ......... | H04W 56/002 |

\* cited by examiner

*Primary Examiner* — Intekhaab A Siddiquee
(74) *Attorney, Agent, or Firm* — Holland & Hart LLP

(57) ABSTRACT

Methods, systems, and devices for wireless communications are described. An integrated access and backhaul (IAB) node may include a first component for communications with a parent node and a second component for communications with a child node. The IAB node may perform a first channel access procedure for a first fixed frame period associated with the first component. The IAB node may perform a second channel access procedure for a second fixed frame period associated with the second component, the second fixed frame period staggered in time with respect to the first fixed frame period in accordance with an offset. The IAB node may communicate with one or more wireless devices during a first channel occupancy time associated with the first fixed frame period, during a second channel occupancy time associated with the second fixed frame period, or a combination thereof based on performing the channel access procedures.

26 Claims, 15 Drawing Sheets

INTEGRATED ACCESS AND BACKHAUL NODE TECHNIQUES FOR UNLICENSED OPERATIONS

FIELD OF TECHNOLOGY

The present disclosure relates to wireless communications, including integrated access and backhaul (IAB) node techniques for unlicensed operations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support integrated access and backhaul (IAB) communications. For example, an IAB node may include a mobile terminal (MT) component for communications with an IAB parent node (e.g., an IAB donor) and a distributed unit (DU) component for communications with an IAB child node (e.g., one or more UEs or another IAB node). In some cases, communications in such systems may be relatively inefficient or may experience interference.

SUMMARY

The described techniques relate to improved methods, systems, devices, and apparatuses that support integrated access and backhaul (IAB) node techniques for unlicensed operations. Generally, the described techniques provide for an IAB node to implement semi-static channel access procedures (e.g., frame based equipment (FBE) operations) in an IAB system, which may result in improved communications efficiency and reliability, among other advantages. For example, the IAB node may include a first component (e.g., a mobile terminal (MT) component) for communications with at least a parent node and a second component (e.g., a distributed unit (DU)) component for communications with at least a child node. The IAB node may communicate via the first component, the second component, or both in accordance with a configuration for the IAB node. For example, the IAB node may perform a first channel access procedure for a first fixed frame period associated with the first component (e.g., the MT component). Additionally or alternatively, the IAB node may perform a second channel access procedure for a second fixed frame period associated with the second component (e.g., the DU component). The configuration may include one or more parameters for the first fixed frame period, the second fixed frame period, or both. For example, the configuration may indicate that the second fixed frame period is staggered by an offset in time, frequency, or both with respect to the first fixed frame period.

A method of wireless communications at an IAB node including a first component for communications with at least a parent node and a second component for communications with at least a child node is described. The method may include performing a first channel access procedure for a first fixed frame period associated with the first component, performing a second channel access procedure for a second fixed frame period associated with the second component, the second fixed frame period staggered in time with respect to the first fixed frame period in accordance with an offset, and communicating with one or more wireless devices during a first channel occupancy time associated with the first fixed frame period, during a second channel occupancy time associated with the second fixed frame period, or a combination thereof based on performing the first channel access procedure and the second channel access procedure.

An apparatus for wireless communications at an IAB node including a first component for communications with at least a parent node and a second component for communications with at least a child node is described. The apparatus may include a processor, memory coupled with the processor, and instructions stored in the memory. The instructions may be executable by the processor to cause the apparatus to perform a first channel access procedure for a first fixed frame period associated with the first component, perform a second channel access procedure for a second fixed frame period associated with the second component, the second fixed frame period staggered in time with respect to the first fixed frame period in accordance with an offset, and communicate with one or more wireless devices during a first channel occupancy time associated with the first fixed frame period, during a second channel occupancy time associated with the second fixed frame period, or a combination thereof based on performing the first channel access procedure and the second channel access procedure.

Another apparatus for wireless communications at an IAB node including a first component for communications with at least a parent node and a second component for communications with at least a child node is described. The apparatus may include means for performing a first channel access procedure for a first fixed frame period associated with the first component, performing a second channel access procedure for a second fixed frame period associated with the second component, the second fixed frame period staggered in time with respect to the first fixed frame period in accordance with an offset, and communicating with one or more wireless devices during a first channel occupancy time associated with the first fixed frame period, during a second channel occupancy time associated with the second fixed frame period, or a combination thereof based on performing the first channel access procedure and the second channel access procedure.

A non-transitory computer-readable medium storing code for wireless communications at an IAB node including a first component for communications with at least a parent node and a second component for communications with at least a child node is described. The code may include instructions executable by a processor to perform a first channel access procedure for a first fixed frame period associated with the first component, perform a second channel access procedure for a second fixed frame period associated with the second component, the second fixed frame period staggered in time with respect to the first fixed frame period in accordance with an offset, and communicate with one or more wireless devices during a first channel occupancy time associated with the first fixed frame period, during a second channel occupancy time associated with the second fixed frame period, or a combination thereof based on performing the first channel access procedure and the second channel access procedure.

Some examples of the method, apparatuses, and non-transitory computer-readable medium described herein may further include operations, features, means, or instructions for identifying a configuration for the IAB node, the configuration indicating one or more parameters associated with the first fixed frame period, the second fixed frame period, or both, and identifying the offset between the first fixed frame period and the second fixed frame period based on the identified configuration, where the second fixed frame period staggered in time with respect to the first fixed frame period in accordance with the identified offset.

Some examples of the method, apparatuses, and non-transitory computer-readable medium described herein may further include operations, features, means, or instructions for receiving, from an IAB donor node, control signaling indicating the configuration.

In some examples of the method, apparatuses, and non-transitory computer-readable medium described herein, the one or more parameters include a starting time for the first fixed frame period, a starting time for the second fixed frame period, a duration of the first fixed frame period, a duration of the second fixed frame period, or any combination thereof.

Some examples of the method, apparatuses, and non-transitory computer-readable medium described herein may further include operations, features, means, or instructions for transmitting, by the first component, communications during an idle period of the second fixed frame period associated with the second component.

Some examples of the method, apparatuses, and non-transitory computer-readable medium described herein may further include operations, features, means, or instructions for determining that the second component failed to obtain a channel during the second fixed frame period, where transmitting the communications may be based on the determining.

Some examples of the method, apparatuses, and non-transitory computer-readable medium described herein may further include operations, features, means, or instructions for transmitting, by the second component, communications during an idle period of the first fixed frame period associated with the first component.

Some examples of the method, apparatuses, and non-transitory computer-readable medium described herein may further include operations, features, means, or instructions for determining that the first component failed to obtain a channel during the first fixed frame period, where transmitting the communications may be based on the determining.

Some examples of the method, apparatuses, and non-transitory computer-readable medium described herein may further include operations, features, means, or instructions for refraining from communicating at the first component during an idle period of the second fixed frame period associated with the second component.

Some examples of the method, apparatuses, and non-transitory computer-readable medium described herein may further include operations, features, means, or instructions for determining that the second component may be communicating during the second fixed frame period, where refraining from communicating at the first component may be based on the determining.

Some examples of the method, apparatuses, and non-transitory computer-readable medium described herein may further include operations, features, means, or instructions for refraining from communicating at the second component during an idle period of the first fixed frame period associated with the first component.

Some examples of the method, apparatuses, and non-transitory computer-readable medium described herein may further include operations, features, means, or instructions for determining that the first component may be communicating during the first fixed frame period, where refraining from communicating at the second component may be based on the determining.

In some examples of the method, apparatuses, and non-transitory computer-readable medium described herein, a second idle period of the second fixed frame period associated with the second component includes the idle period of the first fixed frame period.

In some examples of the method, apparatuses, and non-transitory computer-readable medium described herein, the second idle period begins at a same time as the beginning of the idle period of the first fixed frame period, and where a channel occupancy time of the second fixed frame period may be smaller than a channel occupancy time of the first fixed frame period.

Some examples of the method, apparatuses, and non-transitory computer-readable medium described herein may further include operations, features, means, or instructions for performing the first channel access procedure for the first component in accordance with a first access mode, and performing the second channel access procedure for the second component in accordance with a second access mode.

In some examples of the method, apparatuses, and non-transitory computer-readable medium described herein, the first access mode may be different from the second access mode.

In some examples of the method, apparatuses, and non-transitory computer-readable medium described herein, the first access mode may be the same as the second access mode.

In some examples of the method, apparatuses, and non-transitory computer-readable medium described herein, the first access mode, the second access mode, or both include a dynamic access mode, a semi-static access mode, or a combination thereof.

In some examples of the method, apparatuses, and non-transitory computer-readable medium described herein, performing the first channel access procedure, the second channel access procedure, or both may include operations, features, means, or instructions for monitoring one or more channels for a time period, where communicating with the one or more wireless devices may be based on the monitoring.

In some examples of the method, apparatuses, and non-transitory computer-readable medium described herein, the first channel access procedure, the second channel access procedure, or both include a single slot listen before talk procedure.

In some examples of the method, apparatuses, and non-transitory computer-readable medium described herein, the first component includes an MT component and the second component includes a DU component.

DETAILED DESCRIPTION

Figure 1:
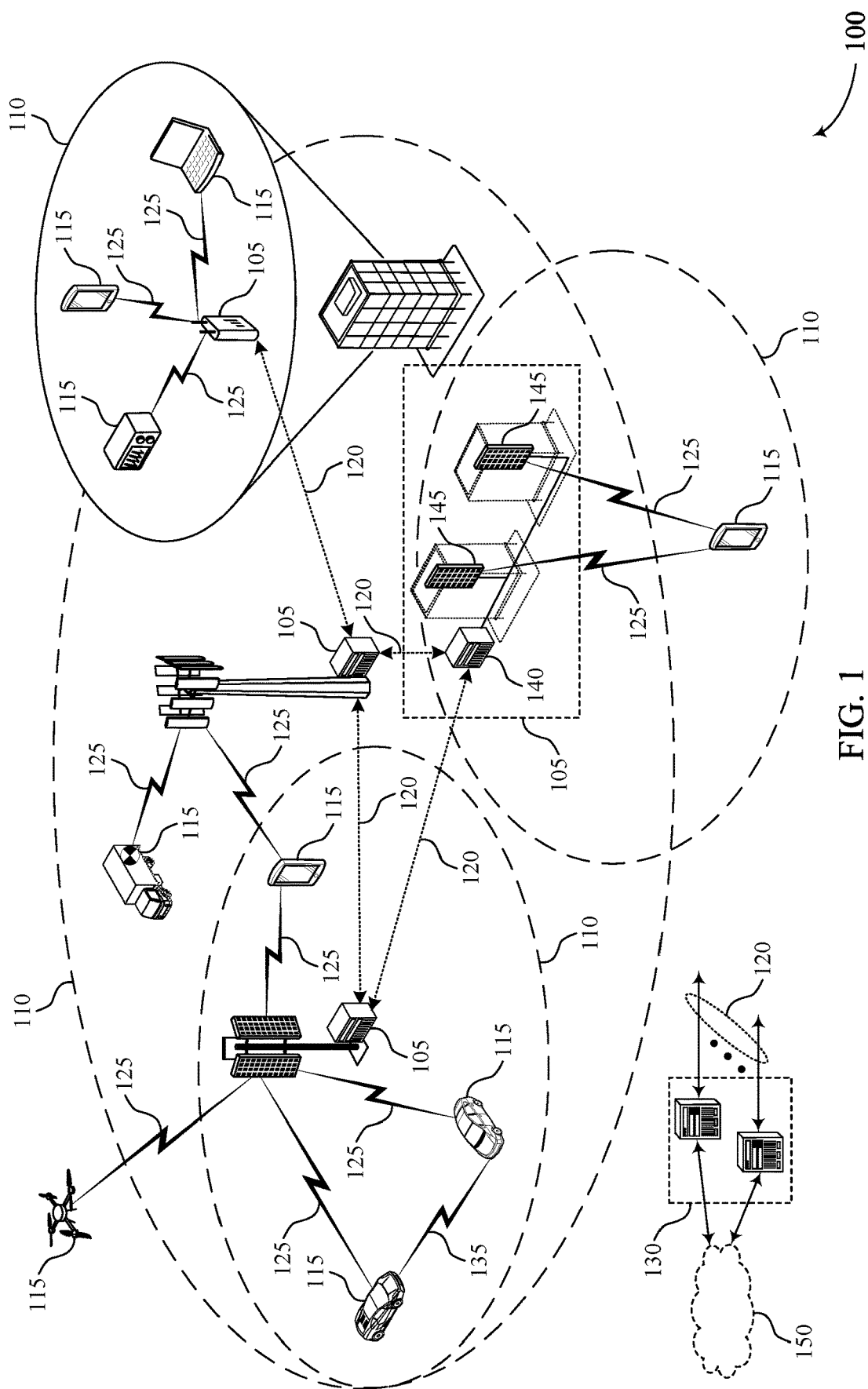
FIG. 1 illustrates an example of a system for wireless communications that supports integrated access and backhaul (IAB) node techniques for unlicensed operations in accordance with aspects of the present disclosure.

Some wireless communications systems may support integrated access and backhaul (IAB) communications. For example, an IAB node may include a mobile terminal (MT) component (e.g., a first component) for communications with an IAB parent node (e.g., an IAB donor node) and a distributed unit (DU) component (e.g., a second component) for communications with an IAB child node (e.g., one or more UEs or another IAB node). In some cases, such IAB communications may be relatively inefficient. For example, an IAB system may not support unlicensed operations, which may result in relatively low available bandwidth.

In accordance with the techniques described herein, an IAB system may implement semi-static channel access procedures for communications (e.g., communications in an unlicensed frequency spectrum), which may result in improved communications efficiency and reliability, among other advantages. For example, an IAB node may identify a configuration for communications using a first component (e.g., an MT component), a second component (e.g., a DU component), or both. In some examples, the configuration may be signaled to the IAB node (e.g., an IAB donor may configure the IAB node with the configuration). Additionally or alternatively, the IAB node may be pre-configured with the configuration. The IAB node may perform one or more channel access procedures to obtain a channel occupancy time for communications via the first component, the second component or both, based on the identified configuration.

As an illustrative example, the configuration may include one or more parameters indicating a channel access mode for the first component or indicating a channel access mode for the second component. In some examples, the IAB node may be configured with a same channel access mode for the first component and the second component (e.g., the MT component and the DU component may both be configured with dynamic channel access modes or semi-static channel access modes). In some other examples, the IAB node may be configured with different channel access modes for the first component and the second component (e.g., the MT component may be configured with a semi-static channel access mode and the DU component may be configured with a dynamic channel access mode).

The IAB node may determine an offset between fixed frame periods corresponding to each component. For example, the IAB node may determine a time offset between at least a first fixed frame period for the MT component and a second fixed frame period for the DU component based on the configuration (e.g., the configuration may include one or more parameters indicating a starting time for the first fixed frame period, a starting time for the second fixed frame period, a duration of the first fixed frame period, a duration of the second fixed frame period, or any combination thereof). Accordingly, the first component may perform a first channel access procedure to obtain a channel occupancy time during the first fixed frame period, and the second component may perform a second channel access procedure to obtain a channel occupancy time during the second fixed frame period. Such staggered fixed frame periods may enable the IAB node to attempt to occupy a channel relatively more frequently, which may improve communications in the system, among other advantages.

In some examples, the first component may refrain from communicating during an idle period corresponding to the first component. Additionally or alternatively, the first component may refrain from communicating during an idle period corresponding to the second component. In some examples, the second component may refrain from communicating during an idle period corresponding to the second component. Additionally or alternatively, the second component may refrain from communicating during an idle period corresponding to the first component.

Aspects of the disclosure are initially described in the context of wireless communications systems. Aspects of the disclosure are then illustrated by and described with reference to an IAB configuration, resource schemes, and process flows. Aspects of the disclosure are further illustrated by and described with reference to apparatus diagrams, system diagrams, and flowcharts that relate to integrated access and backhaul node techniques for unlicensed operations.

FIG. 1 illustrates an example of a wireless communications system 100 that supports integrated access and backhaul node techniques for unlicensed operations in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical)

communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some wireless communications systems, such as unlicensed spectrum communications (e.g., NR unlicensed (NR-U) communications), a device may perform a listen-before-talk (LBT) procedure (such as, a clear channel assessment (CCA)) to determine whether a channel or frequency is available prior to using the channel/frequency for communications. For example, the LBT procedure may include the device using an energy detection (ED) threshold to determine if the channel is currently occupied, such that if a detected energy is below the ED threshold, the channel is determined to be available, and if the detected energy exceeds the ED threshold, the channel is determined to be occupied. If the LBT procedure indicates the channel/frequency is available, the device may be granted access to the channel/frequency for an amount of time before the channel/frequency is again potentially available for other devices to use. This amount of time may be referred to as a channel occupancy time (COT), where the device is occupying (e.g., using) the channel/frequency.

In some examples, an LBT procedure may be a load based equipment (LBE) LBT procedure (e.g., in accordance with a dynamic channel access mode) or a frame based equipment (FBE) LBT procedure. For example, an FBE LBT procedure may include fixed frame periods that include fixed sensing periods where a device (e.g., a DU component and/or an MT component of an IAB node) senses if the channel is free or not. In some aspects, an FBE LBT procedure may be used to contend for resources in an unlicensed band for a wireless communication device (e.g., a UE 115, a base station 105, an IAB node, etc.). Accordingly, the resources may be allocated in a consistent manner based on the FBE operation to allow the wireless communication devices to know when and where the resources occur in the unlicensed band (e.g., within a frame). As an illustrative example, a component of an IAB node may be configured with a starting position of FFPs, a duration of FFPs, etc., which may enable the component to contend for channel access in accordance with a semi-static channel access mode. In some examples, an LBT procedure may be an example of a category 1 LBT procedure, a category 2 LBT procedure, a category 3 LBT procedure, a category 4 LBT procedure, a single slot LBT procedure, etc., among other examples of LBT procedures.

The wireless communications system 100 may support IAB communications. For example, an IAB node may include an MT component (e.g., a first component) for communications with an IAB parent node (e.g., an IAB donor) and a DU component (e.g., a second component) for communications with an IAB child node (e.g., one or more UEs or another IAB node). That is, the IAB node may support both uplink and downlink communications, where the MT component acts as a UE for its parent node and the DU component acts as a base station for its child nodes. However, with both uplink and downlink communications being supported for the IAB node on the corresponding components, if the IAB node attempts to use unlicensed resources for communications, it may be unclear how the IAB node may implement FBE LBT procedures for different components.

The wireless communications system 100 may support techniques for an IAB node to implement semi-static channel access procedures (e.g., FBE operations) at an MT component and/or a DU component as described herein. For example, the IAB node may identify a configuration indicating one or more access modes, fixed frame periods, or both for the MT component, the DU component, or both. As an illustrative example, the IAB node may perform a first channel access procedure for a first fixed frame period associated with the MT component. Additionally or alternatively, the IAB node may perform a second channel access procedure for a second fixed frame period associated with the DU component.

In some examples, the second fixed frame period is staggered by an offset in time, frequency, or both with respect to the first fixed frame period. In some examples, the MT component and the DU component may be configured to honor their respective idle periods (e.g., a component may refrain from communicating during an idle period of a corresponding fixed frame period). Additionally or alternatively, the MT component may be configured to honor the idle periods of the DU component, the DU component may be configured to honor the idle periods of the MT component, or a combination thereof. Such techniques may result in improved communications efficiency and reliability, among other advantages.

Figure 2:
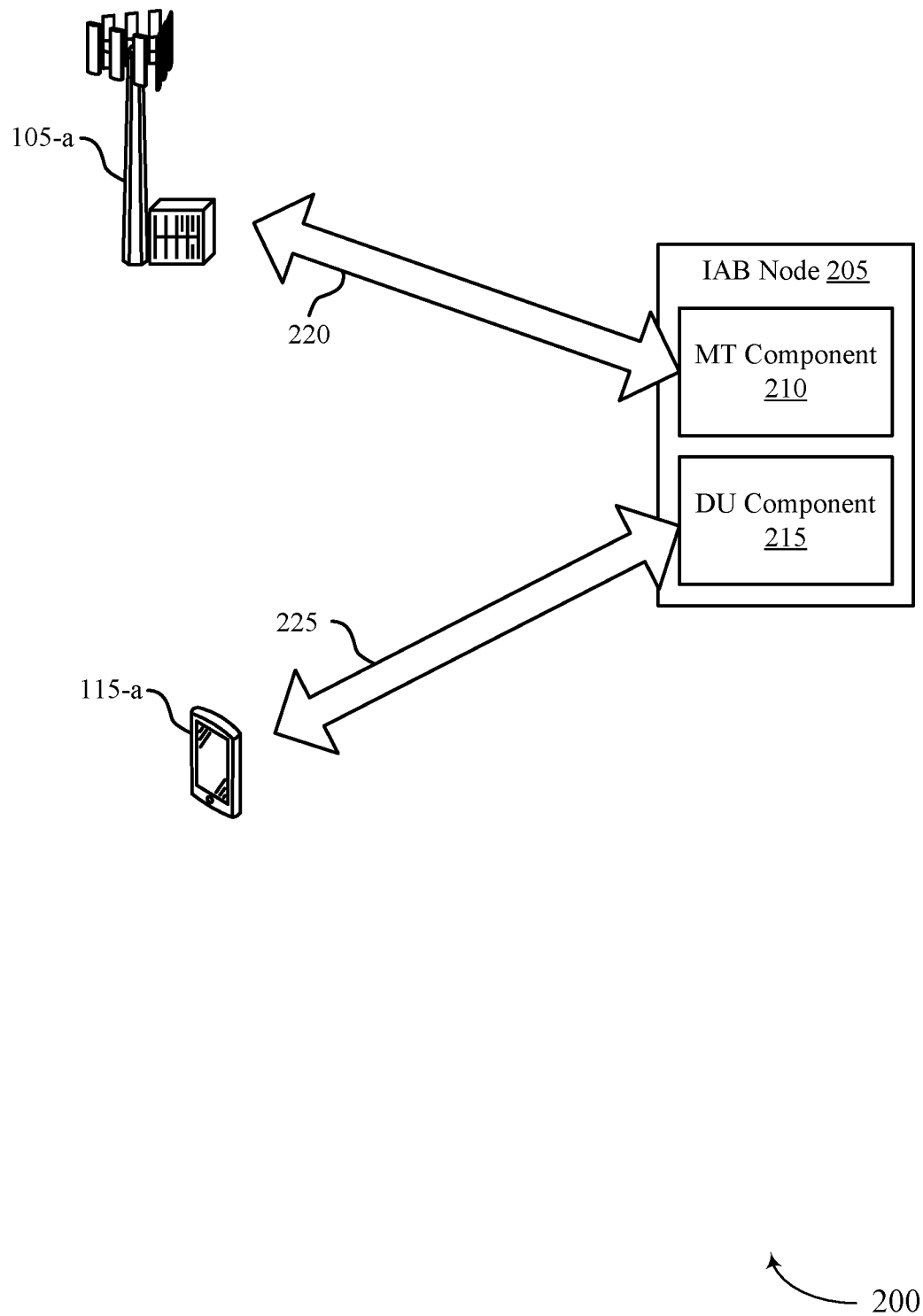
FIG. 2 illustrates an example of a wireless communications system that supports IAB node techniques for unlicensed operations in accordance with aspects of the present disclosure.

FIG. 2 illustrates an example of a wireless communications system 200 that supports contention window updates with IAB nodes for unlicensed operations in accordance with aspects of the present disclosure. Wireless communications system 200 may implement aspects of wireless communications system 100. For example, wireless communications system 200 may include an IAB node 205 that includes both an MT component 210 (e.g., a first component) and a DU component 215 (e.g., a second component). Additionally, the MT component 210 may communicate with a base station 105-a (e.g., a parent node, such as an IAB donor) on resources of a carrier 220, and the DU component 215 may communicate with a UE 115-a (e.g., a child node, an additional IAB node, etc.) on resources of a carrier 225. In some implementations, the communications for the MT component 210 and the DU component 215 may occur based on TDM transmissions between the MT component 210 and the DU component 215.

The wireless communications system 200 may support communications over unlicensed radio frequency spectrums. For example, the IAB node 205 may attempt to communicate with the base station 105-a and the UE 115-a via the corresponding components using unlicensed or shared resources, which may provide the IAB node 205 access to a relatively large bandwidth range, among other advantages. Accordingly, the IAB node may perform CCA procedures (e.g., LBT procedures) to determine whether the shared resources (e.g., shared with one or more radio access technologies) are available prior to using them for communications.

In some examples, the IAB node 205 may support LBE procedures for channel access. For example, the IAB node 205 may use contention windows and random counter generation for CCA counting down procedures in order to access unlicensed resources. Such procedures may be referred to as dynamic channel access procedures (e.g., the MT component 210, the DU component 215, or both may be configured to use dynamic channel access procedures to obtain a COT). In some examples, the IAB node 205 may support FBE procedures. For example, the IAB node 205 may contend for a channel in accordance with a fixed grid (e.g., a fixed frame period may be configured to a quantity of time, including an idle period, as described herein and a component of the IAB node 205 may attempt to obtain a COT at the beginning of each fixed frame period). Such FBE procedures may be referred to as semi-static channel access procedures. For example, the MT component 210, the DU component 215, or both may be configured to use semi-static channel access procedures to obtain a COT, such as by performing LBT procedures in accordance with a fixed frame period configuration.

Accordingly, one or more components of the IAB node 205 may implement semi-static channel access procedures for communications as described herein. For example, the IAB node 205 may identify a configuration for communications using a first component (e.g., the MT component 210), a second component (e.g., the DU component 215), or both. In some examples, the configuration may be signaled to the IAB node 205 (e.g., an IAB donor, such as the base station 105-a. may configure the IAB node 205 with the configuration via control signaling). Additionally or alternatively, the IAB node 205 may be pre-configured with the configuration. The IAB node 205 may perform one or more channel access procedures to obtain a channel occupancy time for communications via the first component, the second component or both, based on the identified configuration.

As an illustrative example, the configuration may include one or more parameters indicating a channel access mode for the MT component 210 or indicating a channel access mode for the DU component 215. In some examples, the IAB node 205 may be configured with a same channel access mode for the MT component 210 and the DU component 215 (e.g., the MT component 210 and the DU component 215 may both be configured with dynamic channel access modes or semi-static channel access modes). In some other examples, the IAB node 205 may be configured with different channel access modes for the MT component 210 and the DU component 215 (e.g., the MT component 210 may be configured with a semi-static channel access mode and the DU component 215 may be configured with a dynamic channel access mode).

The IAB node 205 may determine an offset between fixed frame periods corresponding to each component. For example, the IAB node 205 may determine a time offset between at least a first fixed frame period for the MT component 210 and a second fixed frame period for the DU component 215 based on the configuration (e.g., the configuration may include one or more parameters indicating a starting time for the first fixed frame period, a starting time for the second fixed frame period, a duration of the first fixed frame period, a duration of the second fixed frame period, or any combination thereof). Accordingly, the MT component 210 may perform a first channel access procedure to obtain a channel occupancy time during the first fixed frame period, and the DU component 215 may perform a second channel access procedure to obtain a channel occupancy time during the second fixed frame period. Such staggered fixed frame periods may enable the IAB node 205 to attempt to occupy a channel relatively more frequently, which may improve communications in the system, among other advantages.

In some examples, the MT component 210 may refrain from communicating during an idle period corresponding to the MT component 210. Additionally or alternatively, the MT component 210 may refrain from communicating during an idle period corresponding to the DU component 215. In some examples, the DU component 215 may refrain from communicating during an idle period corresponding to the DU component 215. Additionally or alternatively, the DU component 215 may refrain from communicating during an idle period corresponding to the MT component 210.

Figure 3:
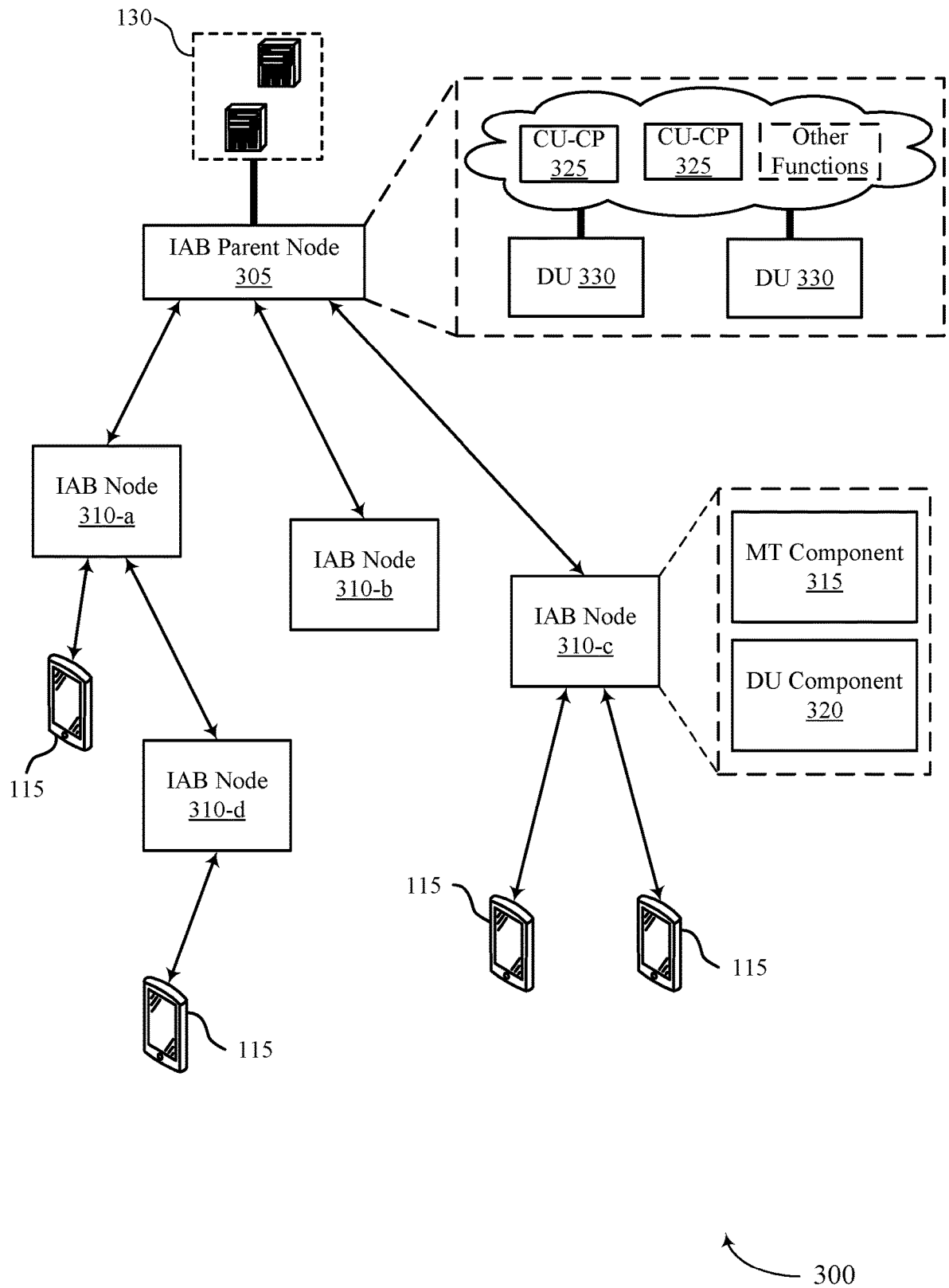
FIG. 3 illustrates an example of an IAB configuration that supports IAB node techniques for unlicensed operations in accordance with aspects of the present disclosure.

FIG. 3 illustrates an example of an IAB configuration 300 that supports integrated access and backhaul node techniques for unlicensed operations in accordance with aspects of the present disclosure. IAB configuration 300 may implement aspects of wireless communications systems 100 and 200. For example, the IAB configuration 300 may include the core network 130, one or more IAB nodes 310, and one or more UEs 115. The core network 130 may be connected to an IAB parent node 305 (e.g., a base station 105, a network device, etc.), and the IAB parent node 305 may be connected to one or more IAB nodes 310, such as a first IAB node 310-a, a second IAB node 310-b, and a third IAB node 310-c. Each of the IAB nodes 310 may include an MT component 315 and a DU component 320.

The IAB parent node 305 (e.g., IAB-donor) may provide a UE interface to the core network 130 and wireless backhauling functionality to the IAB nodes 310. For example, the IAB parent node 305 may include one or more centralized unit (CU) control plane functions 325 (e.g., and other functions) to communicate with the core network 130 (e.g., via wireline internet protocol (IP) connections) and may include one or more DUs 330 to communicate with the IAB nodes 310 (e.g., via wireless backhaul links). Each of the IAB nodes 310 may communicate with the respective child nodes via wireless access links.

As previously described, the IAB nodes 310 may include different components for different types of communications. For example, the MT component 315 may act as a UE for the IAB parent node 305 (e.g., for uplink communications to the IAB parent node 305). Additionally, the DU component 320 may act as a base station for one or more child nodes (e.g., for downlink communications with the one or more child nodes, such as UEs 115 and other IAB nodes 310) with layer-2 functionalities (e.g., MAC scheduler).

Based on including the MT component 315 and the DU component 320 that support transmitting uplink communications and downlink communications, respectively, different issues may arise for accommodating the different transmission directions. For example, an MT component 315 and a DU component 320 may attempt to communicate inefficiently (e.g., the IAB node 310 may not support FBE operations and the MT component 315 may interfere with or be unable to obtain a COT based on communications associated with the DU component 320, or vice versa).

Accordingly, the techniques described herein may enable an IAB node 310 to perform LBT procedures for the MT component 315 and the DU component 320, such as semi-static channel access procedures (e.g., FBE operations), which may reduce a processing overhead, improve communications efficiency, increase a quantity of times that the IAB node 310 can contend for channel access, etc., among other advantages. For example, the IAB node 310 may communicate via a first component (e.g., a MT component 315), a second component (e.g., a DU component 320), or both in accordance with a configuration for the IAB node 310. The IAB node 310 may perform a first channel access procedure for a first fixed frame period associated with the first component. Additionally or alternatively, the IAB node may perform a second channel access procedure for a second fixed frame period associated with the second component. The configuration may include one or more parameters for the first fixed frame period, the second fixed frame period, or both. For example, the configuration may indicate that the second fixed frame period is staggered by an offset in time, frequency, or both with respect to the first fixed frame period. In some examples, the offset may be zero. In some other examples, the offset may be any other value or quantity.

Figure 4:
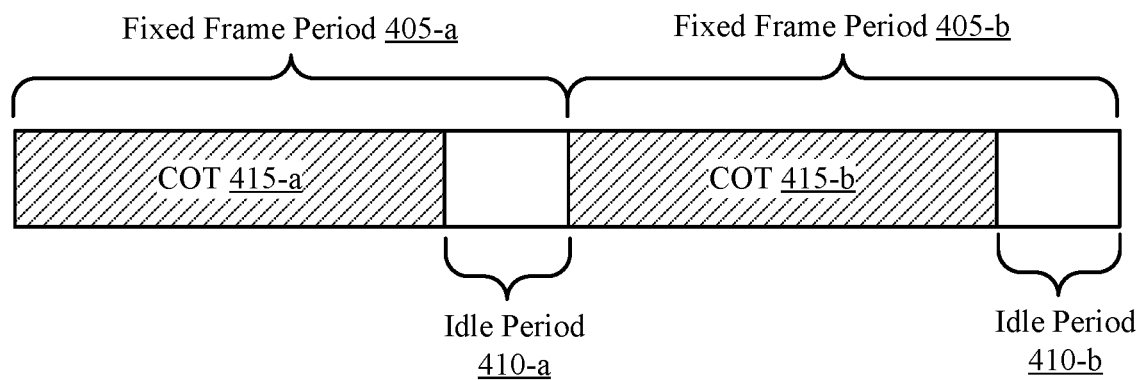
FIGS. 4-7 illustrates examples of resource schemes that support IAB node techniques for unlicensed operations in accordance with aspects of the present disclosure.

FIG. 4 illustrates an example of a resource scheme 400 that supports integrated access and backhaul node techniques for unlicensed operations in accordance with aspects of the present disclosure. In some examples, the resource scheme 400 may implement aspects of wireless communications systems 100 or 200, the IAB configuration 300, or any combination thereof. For example, the resource scheme 400 may illustrate a wireless device implementing fixed frame periods 405 for performing semi-static channel access procedures. In some examples, the wireless device may be an example of an IAB node, a UE, a base station, or any combination thereof as described herein.

The resource scheme 400 may illustrate time frequency resources, such as resources in an unlicensed spectrum, among other examples. For example, the wireless device may attempt to secure the COT 415-a for communications in the fixed frame period 405-a by performing an LBT procedure. In some examples, the wireless device may be an example of a base station (e.g., a DU component of an IAB node, a gNB, etc.) contending for channel access (e.g., the COT 415-a may be referred to as a gNB initiated COT). Additionally or alternatively, or the wireless device may be an example of a UE (e.g., an MT component, a UE 115, etc.) contending for channel access (e.g., the COT 415-a may be referred to as a UE initiated COT).

The wireless device may be configured with the fixed frame periods 405. For example, the wireless device may determine a configuration with one or more parameters indicating a duration of each fixed frame period 405 (e.g., the fixed frame periods 405-a and 405-b may have a duration of 1 ms, 2 ms, 2.5 ms, 4 ms, 5 ms, 10 ms, etc., including the idle periods 410), a starting time for the fixed frame period 405-a, among other examples of parameters, or any combination thereof. For instance, the starting positions for the fixed frame periods 405 may begin from an even radio frame, which may be represented by i*P, where i={0, 1, . . . , (20/p−1)} and P represents the fixed frame period (e.g., in ms).

The wireless device may implement the fixed frame periods 405 for semi-static channel access procedures (e.g., the wireless device may be operating in an FBE mode). For example, the wireless device may contend for the channel at a fixed time grid segmented by the fixed frame periods 405-a and 405-b, although any quantity of fixed frame periods 405 may be used. In other words, the wireless device may perform a channel access procedure at or near the beginning of each fixed frame period 405-a (e.g., the wireless device may listen to the channel during the idle period 410-a in order to determine whether the wireless device can obtain the COT 415-b of the fixed frame period 405-b). In some examples, the channel access procedures may be examples of LBT procedures. For example, the LBT procedure may be a single-slot LBT procedure (e.g., a gNB or UE or an IAB node may perform sensing for evaluating a channel availability, and the sensing may be performed at least during a sensing slot duration $T_{sl}$=9 us), category 1 LBT procedure, a category 2 LBT procedure, a category 3 LBT procedure, a category 4 LBT procedure, or any combination thereof, among other examples of channel access procedures.

The wireless device may communicate during the COT 415-a or the COT 415-b based on a result of the one or more channel access procedures. For example, the wireless device may perform a first channel access procedure prior to or at the beginning of the fixed frame period 405-a (e.g., the wireless device may perform an LBT procedure during an idle period previous to the fixed frame period 405-a). If the wireless device determines that the channel is available based on a result of the procedure, the wireless device may obtain the COT 415-a (e.g., the wireless device may transmit or receive communications during the COT 415-a). Alternatively, the wireless device may determine that the channel is occupied based on a result of the procedure, and the wireless device may refrain from communicating during the COT 415-a and reattempt an LBT procedure prior to or during the fixed frame period 405-b. For example, regardless of whether the wireless device obtained the COT 415-a, the wireless device may refrain from communicating during the idle period 410-a and may perform a channel access procedure during the idle period 410-a to determine whether the channel is occupied. If the channel is available, the wireless device may secure the COT 415-b for communications, and so on.

Figure 5:
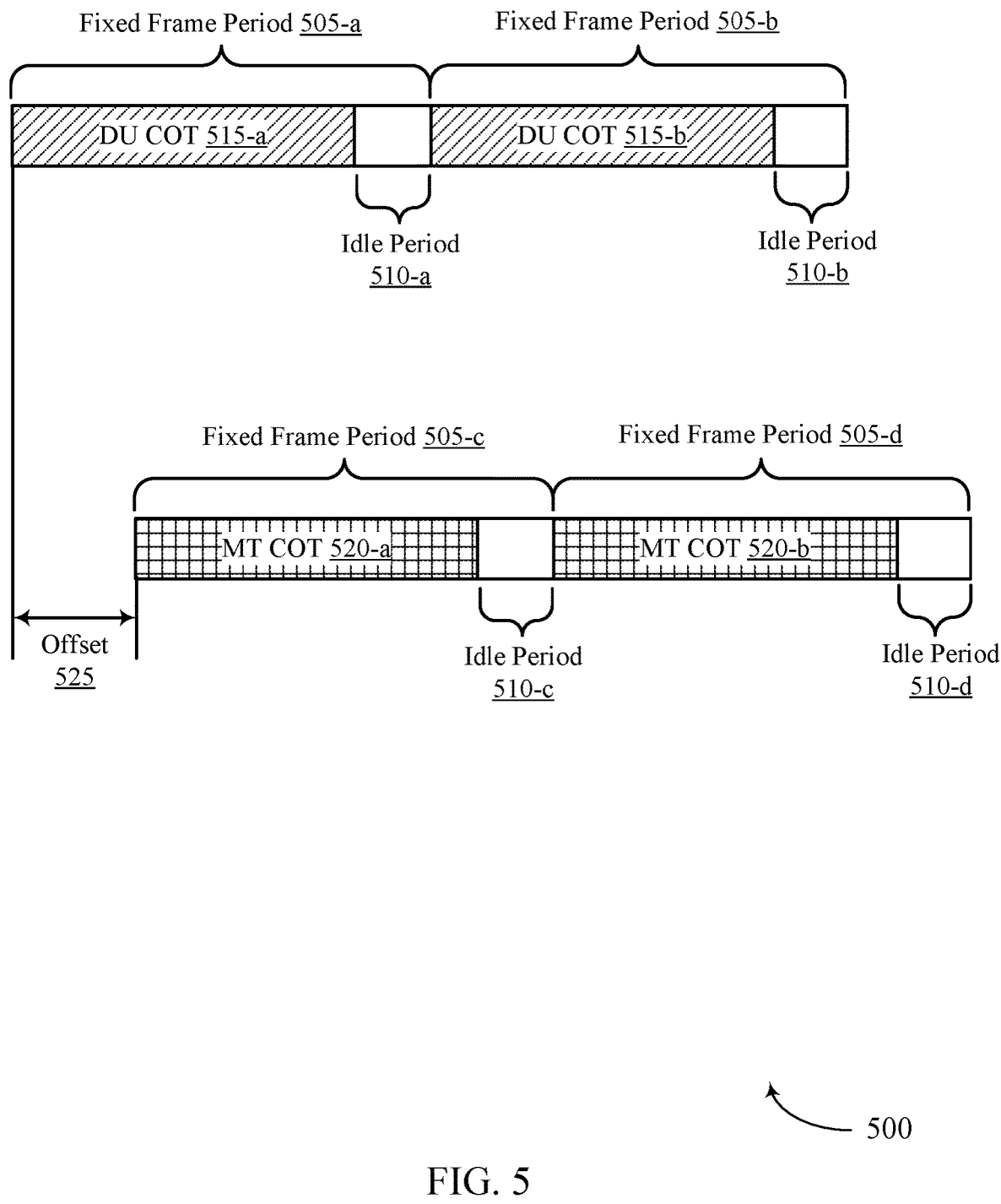

FIG. 5 illustrates an example of a resource scheme 500 that supports integrated access and backhaul node techniques for unlicensed operations in accordance with aspects of the present disclosure. In some examples, the resource scheme 500 may implement aspects of the wireless communications systems 100 or 200, the IAB configuration 300, the resource scheme 400, or any combination thereof. For example, the resource scheme 500 may illustrate a wireless device, such as an IAB node, implementing fixed frame periods 505 for performing semi-static channel access procedures.

For example, the wireless device may include a first component (e.g., an MT component) for communications with at least a parent node and a second component (e.g., a DU component) for communications with at least a child node. The second component may be configured with the fixed frame period 505-a and the fixed frame period 505-b. Additionally or alternatively, the first component may be configured with the fixed frame period 505-c and the fixed frame period 505-d. For example, the wireless device may be configured (e.g., via control signaling from a parent node and/or preconfigured) with a configuration. The configuration may include one or more parameters associated with the components, the fixed frame periods 505, the idle periods 510, or any combination thereof. The configuration may indicate an offset 525 (e.g., an offset of zero or any value in time or frequency between different fixed frame periods 505). For example, the parameters may indicate different starting periods, resources, durations, or a combination thereof of the fixed frame period 505-a and the fixed frame period 505-c, resulting in a time offset or a frequency offset or both between the fixed frame periods 505 associated with the DU component and the fixed frame period 505 associated with the MT component. In other words, the fixed frame periods for the MT component may be staggered with respect to the fixed frame periods for the DU component. Such staggering between the fixed frame period 505-a and the fixed frame period 505-c may enable the IAB node to contend for channel access (e.g., at different components) at different time instances, which may allow multiple sensing opportunities for IAB node transmissions or receptions.

In some examples, the components may be configured to "honor" their respective idle periods 510. For example, the first component may refrain from communicating during the idle period 510-c and the idle period 510-d. Additionally or alternatively, the second component may refrain from communicating during the idle period 510-a and the idle period 510-b. In some such examples, the first component may communicate during idle periods 510 associated with the second component (e.g., the idle periods 510-a and 510-b), and vice versa (e.g., the second component may communicate during the idle periods 510-c and 510-d).

Figure 6A:
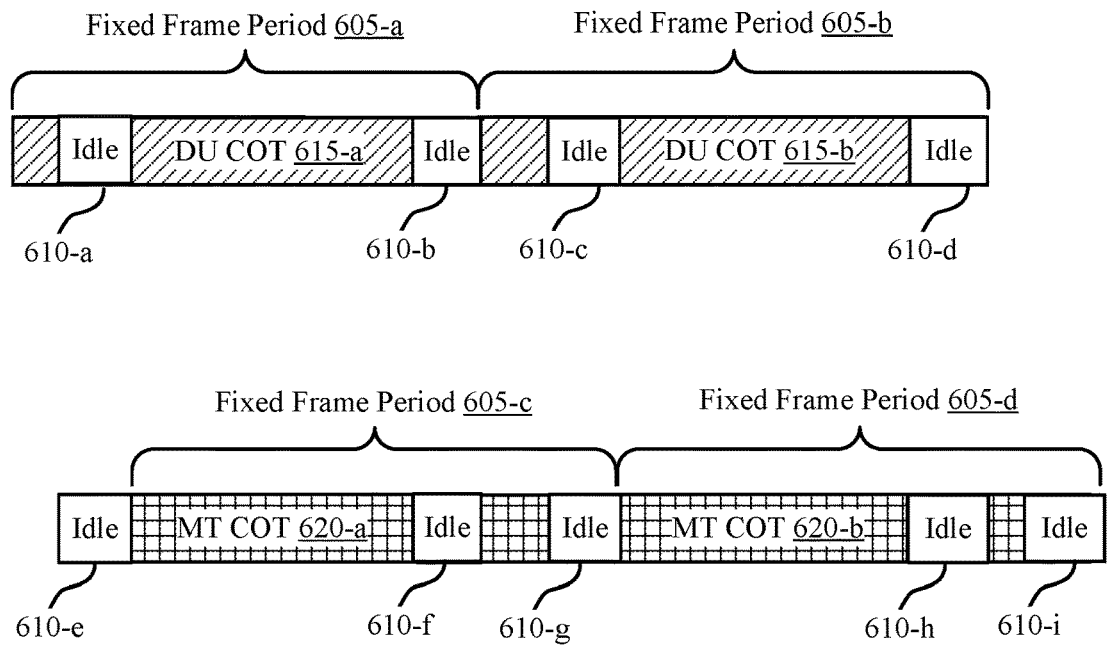
Figure 6B:
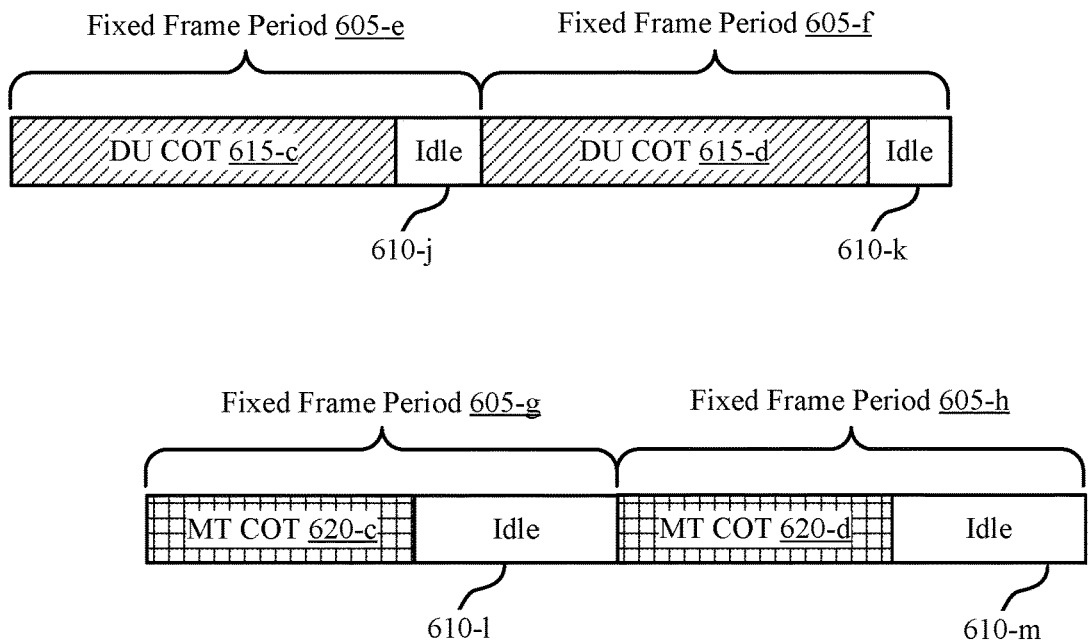

FIGS. 6A and 6B illustrate examples of resource schemes 600 and 601, respectively, that support integrated access and backhaul node techniques for unlicensed operations in accordance with aspects of the present disclosure. In some examples, the resource schemes 600 and 601 may implement aspects of the wireless communications systems 100 or 200, the IAB configuration 300, the resource schemes 400 or 500, or any combination thereof. For example, the resource schemes 600 and 601 may illustrate idle period configurations for semi-static channel access procedures at an IAB node.

The resource scheme 600, the resource scheme 601, or both may implement one or more aspects of the resource scheme 500. For example, the fixed frame periods 605-c and 605-d may be associated with a first component of an IAB node (e.g., an MT component) and the fixed frame periods 605-a and 605-b may be associated with a second component of the IAB node (e.g., a DU component). In some examples, the fixed frame periods 605 associated with the first component may be staggered in time, frequency, or both with respect to the fixed frame periods 605 associated with the second component (e.g., the fixed frame period 605-a may start at a different time than the fixed frame period 605-c in accordance with an identified offset).

In some examples, the first component and the second component may be configured to "honor" at least a portion of the other components idle periods 610. As an illustrative example, the resource scheme 600 may show an example where each component refrains from communications during the idle periods 610 of both components. For instance, the first component may be configured with a first set of idle periods 610 associated with the first component (e.g., the idle periods 610-e, 610-g, and 610-i). The first component may refrain from communicating during the first set of idle periods. Additionally or alternatively, the first component may be configured with a second set of idle periods 610 associated with the second component (e.g., idle periods 610-f and 610-h). That is, the first component may be configured with idle periods at the end of each fixed frame period 605-c and 605-d, and the first component may also refrain from communicating during idle periods occurring at the end of the fixed frame periods 605-a and 605-b. Likewise, the second component may be configured with the second set of idle periods associated with the second component (e.g., the idle periods 610-b and 610-d), in addition or alternative to the idle periods associated with the first component (e.g., the idle periods 610-a and 610-c).

As another illustrative example, the resource scheme 601 may show an example where the idle periods 610 of at least one component are extended to include the idle periods 610 of another component. For example, the first component (e.g., the MT component) may have an idle period 610-1 with a duration long enough to also include a duration of the idle period 610-j associated with the second component.

Such examples may enable the components to avoid interference. For example, by refraining from communicating during each other's idle periods 610, the components may increase a likelihood of successfully obtaining a DU COT 615 or a MT COT 620 for a respective fixed frame period 605.

In some examples, the IAB node may determine whether a channel is occupied by one or more components. The IAB node may be configured to honor an idle period based on a result of the determination. For example, a DU component may refrain from communications during an idle period 610 of an MT component if the MT component is occupying a corresponding MT COT 620 (e.g., if the MT has obtained the MT COT 620-*a*, the DU may refrain from communicating during the idle period 610-*g* or 610-*c*). Additionally or alternatively, an MT component may refrain from communications during an idle period 610 of a DU component if the DU component is occupying a corresponding DU COT 615 (e.g., if the DU component has obtained the DU COT 615-*a*, the MT component may refrain from communicating during the idle period 610-*b* or 610-*f*). In other words, in some cases an idle period 610 may be honored if the channel is occupied or the idle period 610 may be ignored (e.g., a component may transmit or receive communications during the idle period 610) if the channel is not occupied. In some examples, any combination of idle period configurations may be applied. As merely one example, the idle period 610-1 may be shortened if the DU component fails to obtain the DU COT 615-*c* (e.g., the MT component may use a shortened MT COT 620-*c* if the DU COT 615-*c* was obtained and may use a relatively longer MT COT 620-*c* if the DU COT 615-*c* was not obtained by the DU component).

Figure 7:
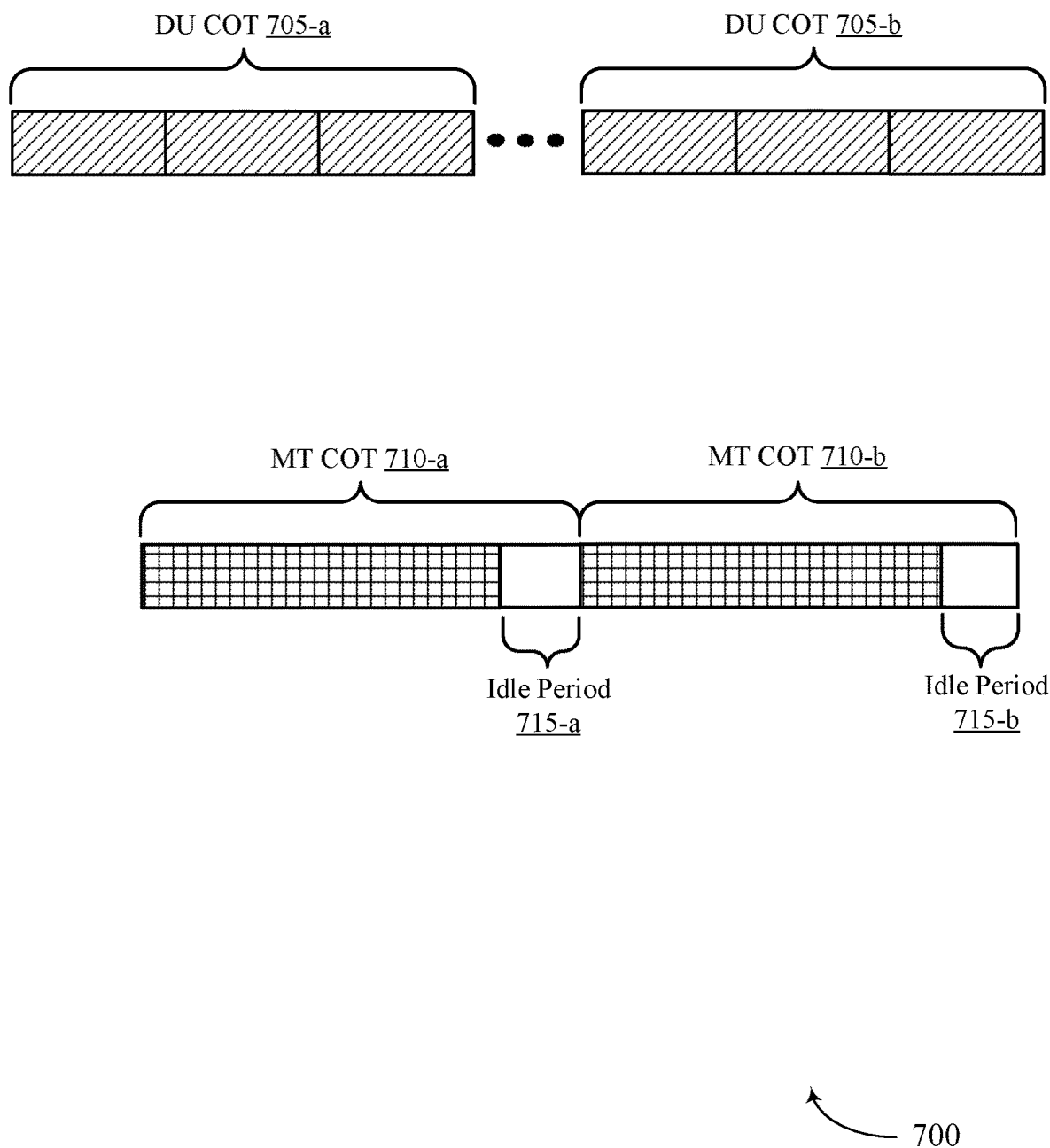

FIG. 7 illustrates an example of a resource scheme 700 that supports integrated access and backhaul node techniques for unlicensed operations in accordance with aspects of the present disclosure. In some examples, the resource scheme 700 may implement aspects of the wireless communications systems 100 or 200, the IAB configuration 300, the resource schemes 400, 500, 600, 601, or any combination thereof. For example, the resource scheme 700 may illustrate a wireless device, such as an IAB node, implementing one or more channel access modes for one or more components.

The wireless device may be an IAB node with an MT component and a DU component as described herein. The device may determine a configuration indicating a channel access mode for one or both of the components. In some examples, the device may be configured with a same channel access mode. For example, the device may be configured to use dynamic channel access modes for both the MT component and the DU component, or the device may be configured to use semi-static channel access modes for both the MT component and the DU component. In some other examples, the device may be configured with different channel access modes. For example, as shown for illustrative clarity in the resource scheme 700, the MT component may be configured with a semi-static channel access mode (e.g., FBE operations) and the DU component may be configured with a dynamic channel access mode (e.g., LBE operations), although any combination or quantity of access modes and components may be used.

For example, the DU component may attempt to obtain a DU COT 705-*a* or a DU COT 705-*b* using a dynamic channel access procedure as described herein. Additionally or alternatively, the MT component may attempt to obtain a MT COT 710-*a* or a MT COT 710-*b* using a semi-static channel access procedure (e.g., using fixed frame periods with idle periods 715-*a* and 715-*b*) as described herein. Thus, the DU component may use a dynamic channel access mode while the MT component may use semi-static channel access mode, which may enable the MT component to implement (e.g., support) single-slot LBT procedures (e.g., category 2 LBT procedure) irrespective of an LBT functionality supported by the DU component, although it is to be understood that any component may be configured with any channel access mode (e.g., the MT component may use a dynamic mode and the DU component may use a semi-static channel access mode).

Figure 8:
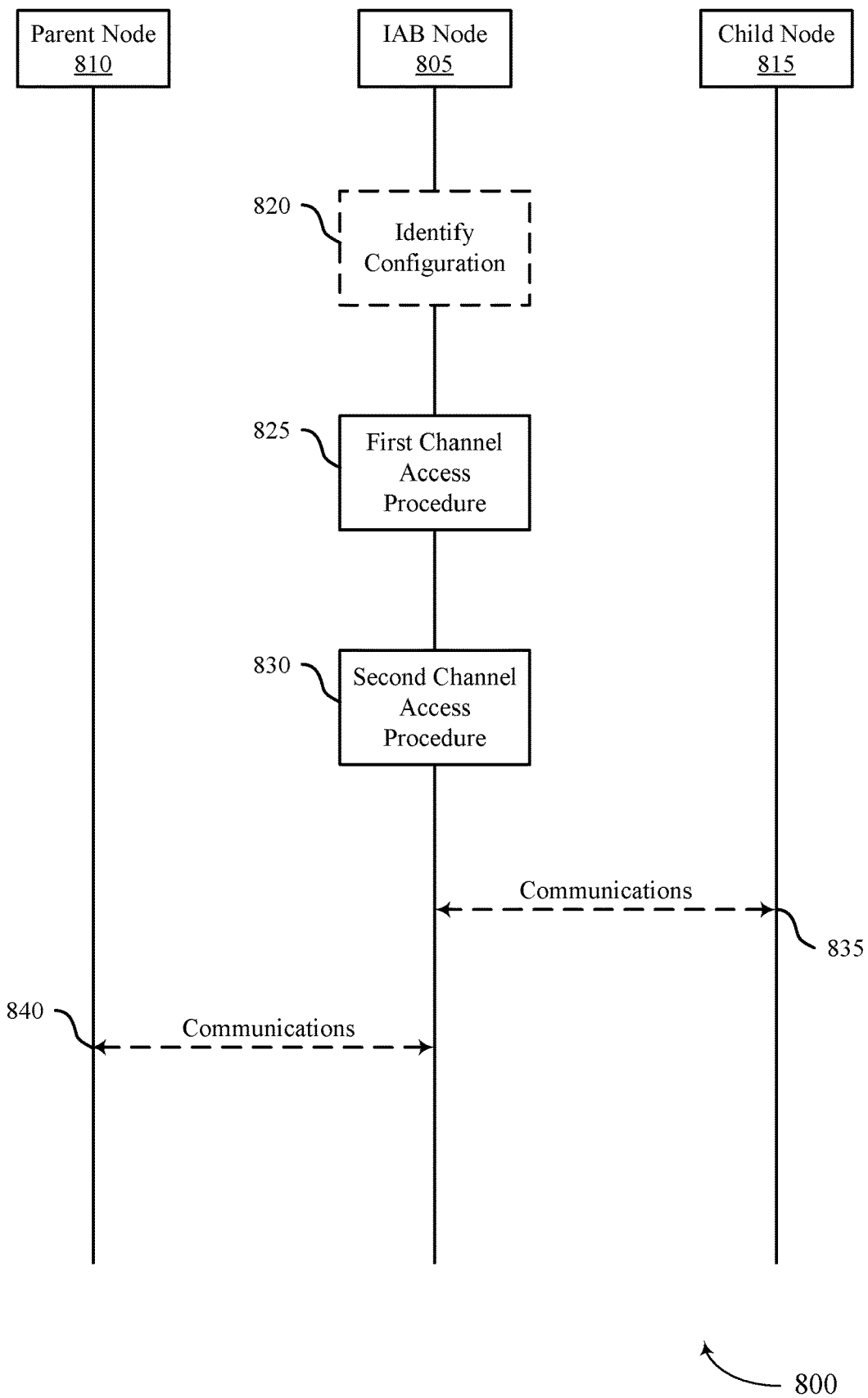
FIG. 8 illustrates an example of a process flow that supports IAB node techniques for unlicensed operations in accordance with aspects of the present disclosure.

FIG. 8 illustrates an example of a process flow 800 that supports integrated access and backhaul node techniques for unlicensed operations in accordance with aspects of the present disclosure. In some examples, the process flow 800 may implement aspects of wireless communications systems 100 and 200, IAB configuration 300, resource schemes 400-700, or any combination thereof. For example, the process flow 800 may include an IAB node 805, a parent node 810, and a child node 815. The IAB node 805 may include a first component (e.g., an MT component) that communicates with at least the parent node 810 and a second component (e.g., a DU component) that communicates with at least the child node 815. In some implementations, the parent node 810 may be a base station, an additional IAB node (e.g., an IAB donor node), or another type of network device, and the child node may be a UE, an additional IAB node, or another type of receiving device. As such, the first component of the IAB node 805 may communicate with the parent node 810, and the second component of the IAB node 805 may communicate with the child node 815.

In the following description of the process flow 800, the operations between the IAB node 805, the parent node 810, and the child node 815 may be transmitted in a different order than the exemplary order shown, or the operations performed by the IAB node 805, the parent node 810, and the child node 815 may be performed in different orders or at different times. Certain operations may also be left out of the process flow 800, or other operations may be added to the process flow 800. It is to be understood that while the IAB node 805, the parent node 810, and the child node 815 are shown performing a number of the operations of process flow 800, any wireless device may perform the operations shown.

At 820, the IAB node 805 may identify a configuration. For example, the parent node 810 may configure the IAB node 805 with one or more parameters of the configuration via control signaling, such as RRC signaling, MAC-CE signaling, downlink control information (DCI) messaging, among other examples of control signaling, or any combination thereof. Additionally or alternatively, the IAB node 805 may be pre-configured with one or more parameters of the configuration. For example, the IAB node may determine a channel access mode for the MT component, a channel access mode for the DU component, a fixed frame configuration for one or both components (e.g., a starting position, duration, etc., for fixed frame periods for a respective component), an offset between a fixed frame period of the MT component with respect to a fixed frame period of the DU component, etc.

At 825, the IAB node 805 may perform a first channel access procedure. For example, the IAB node 805 may perform a LBT procedure using the MT component in accordance with the configuration (e.g., the LBT procedure may be performed in accordance with a channel access mode, a fixed frame configuration, etc.) as described herein.

At 830, the IAB node 805 may perform a second channel access procedure. For example, the IAB node 805 may perform a LBT procedure using the DU component in accordance with the configuration (e.g., the LBT procedure may be performed in accordance with a channel access mode, a fixed frame configuration, etc.) as described herein. In some examples, a fixed frame period associated with the MT component may be staggered by an offset in time with reference to the fixed frame period associated with the DU component.

At 835, the IAB node 805 may communicate with the child node 815 based on a result of the second channel access procedure and at 840 the IAB node 805 may communicate with the parent node 810 based on a result of the first channel access procedure. For example, if the components determine that a channel associated with such communications is available based on a respective channel access procedure, the components may obtain a channel occupancy time for the communications. In some examples, the components may be configured to honor each other's idle periods as described herein. In some other examples, the components may be configured to honor their own idle periods as described herein.

Figure 9:
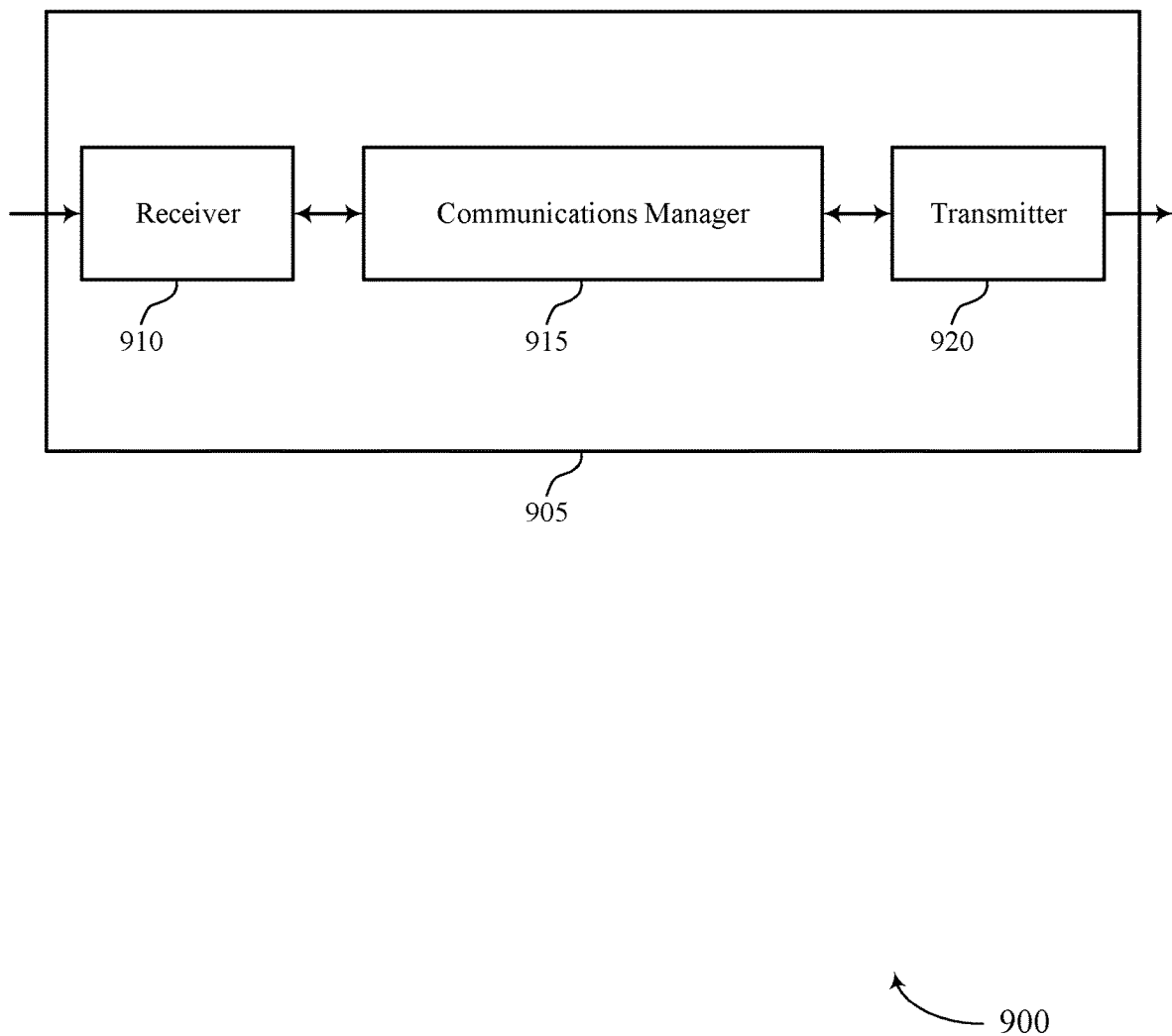
FIGS. 9 and 10 show block diagrams of devices that support IAB node techniques for unlicensed operations in accordance with aspects of the present disclosure.

FIG. 9 shows a block diagram 900 of a device 905 that supports integrated access and backhaul node techniques for unlicensed operations in accordance with aspects of the present disclosure. The device 905 may be an example of aspects of an IAB node, a UE 115 (e.g., DU component), or a base station 105 (e.g., MT component) as described herein. The device 905 may include a receiver 910, a communications manager 915, and a transmitter 920. The device 905 may also include one or more processors, memory coupled with the one or more processors, and instructions stored in the memory that are executable by the one or more processors to enable the one or more processors to perform unlicensed operation features, as discussed herein. Each of these components may be in communication with one another (e.g., via one or more buses).

Receiver 910 may receive information such as packets, user data, or control information associated with various information channels (e.g., control channels, data channels, and information related to integrated access and backhaul node techniques for unlicensed operations, etc.). Information may be passed on to other components of the device 905. The receiver 910 may be an example of aspects of the transceiver 1220 or 1320 as described with reference to FIGS. 12 and 13. The receiver 910 may utilize a single antenna or a set of antennas.

The communications manager 915 may perform a first channel access procedure for a first fixed frame period associated with the first component, perform a second channel access procedure for a second fixed frame period associated with the second component, the second fixed frame period staggered in time with respect to the first fixed frame period in accordance with an offset, and communicate with one or more wireless devices during a first channel occupancy time associated with the first fixed frame period, during a second channel occupancy time associated with the second fixed frame period, or a combination thereof based on performing the first channel access procedure and the second channel access procedure. The communications manager 915 may be an example of aspects of the communications manager 1210 or 1310 as described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The communications manager 915 as described herein may be implemented to realize one or more potential advantages. One implementation may allow the device 905 to implement semi-static channel access procedures (e.g., FBE operations) for one or more components (e.g., MT component or DU component). Such operations may provide improvements to reliability and efficiency in communications for a wireless communications system, among other benefits.

Transmitter 920 may transmit signals generated by other components of the device 905. In some examples, the transmitter 920 may be collocated with a receiver 910 in a transceiver module. For example, the transmitter 920 may be an example of aspects of the transceiver 1220 or 1320 as described with reference to FIGS. 12 and 13. The transmitter 920 may utilize a single antenna or a set of antennas.

Figure 10:
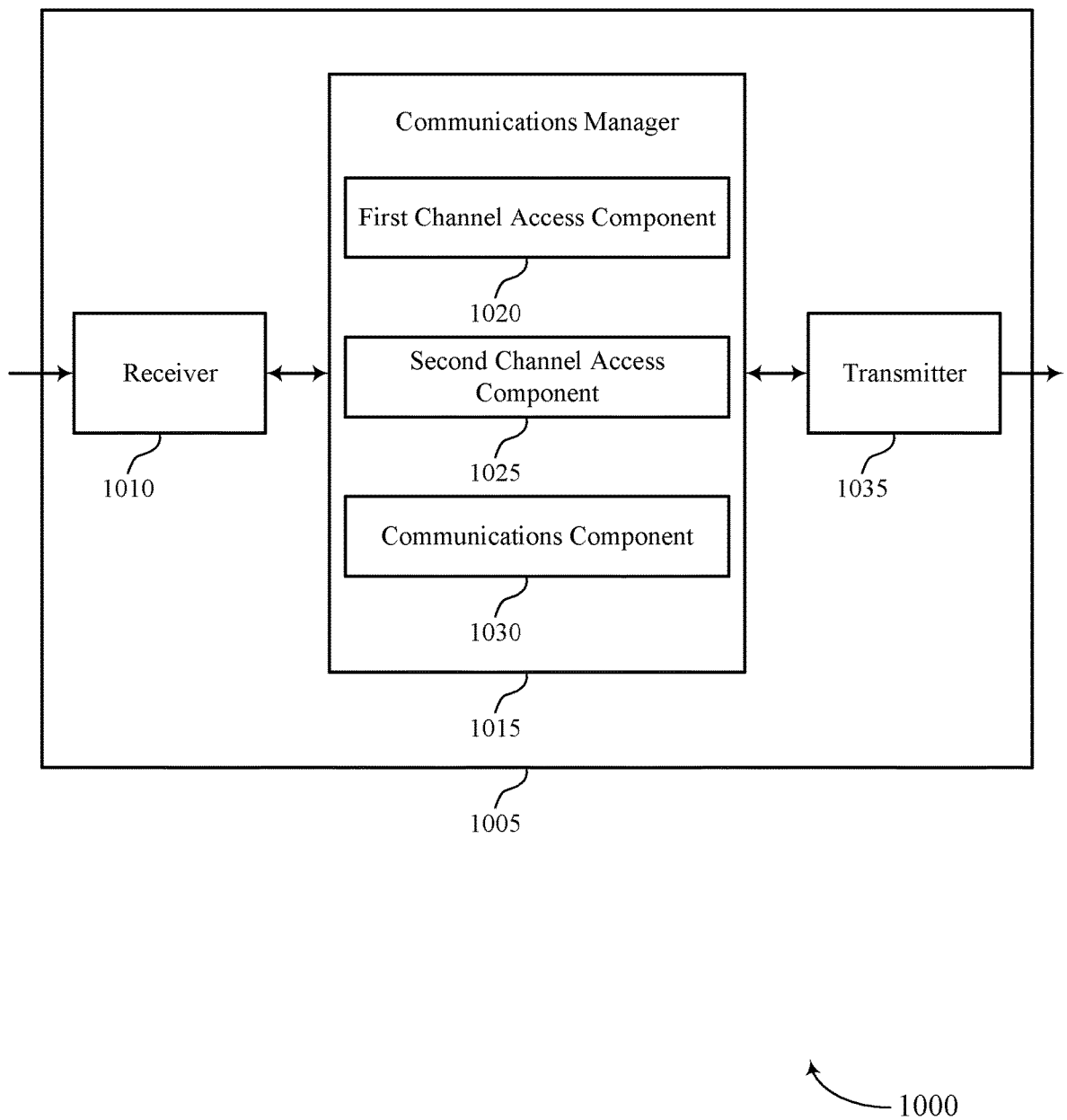

FIG. 10 shows a block diagram 1000 of a device 1005 that supports integrated access and backhaul node techniques for unlicensed operations in accordance with aspects of the present disclosure. The device 1005 may be an example of aspects of a device 905, an IAB node, a UE 115 (e.g., DU component), or a base station 105 (e.g., MT component) as described herein. The device 1005 may include a receiver 1010, a communications manager 1015, and a transmitter 1035. The device 1005 may also include a processor. Each of these components may be in communication with one another (e.g., via one or more buses).

Receiver 1010 may receive information such as packets, user data, or control information associated with various information channels (e.g., control channels, data channels, and information related to integrated access and backhaul node techniques for unlicensed operations, etc.). Information may be passed on to other components of the device 1005. The receiver 1010 may be an example of aspects of the transceiver 1220 or 1320 as described with reference to FIGS. 12 and 13. The receiver 1010 may utilize a single antenna or a set of antennas.

The communications manager 1015 may be an example of aspects of the communications manager 915 as described herein. The communications manager 1015 may include a first channel access component 1020, a second channel access component 1025, and a communications component 1030. The communications manager 1015 may be an example of aspects of the communications manager 1210 or 1310 as described herein.

The first channel access component 1020 may perform a first channel access procedure for a first fixed frame period associated with the first component.

The second channel access component 1025 may perform a second channel access procedure for a second fixed frame period associated with the second component, the second fixed frame period staggered in time with respect to the first fixed frame period in accordance with an offset.

The communications component 1030 may communicate with one or more wireless devices during a first channel occupancy time associated with the first fixed frame period, during a second channel occupancy time associated with the second fixed frame period, or a combination thereof based on performing the first channel access procedure and the second channel access procedure.

Transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 or 1320 as described with reference to FIGS. 12 and 13. The transmitter 1035 may utilize a single antenna or a set of antennas.

In some cases, the first channel access component 1020, the second channel access component 1025, and the communications component 1030 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the first channel access component 1020, the second channel access component 1025, and the communications component 1030 as discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 11:
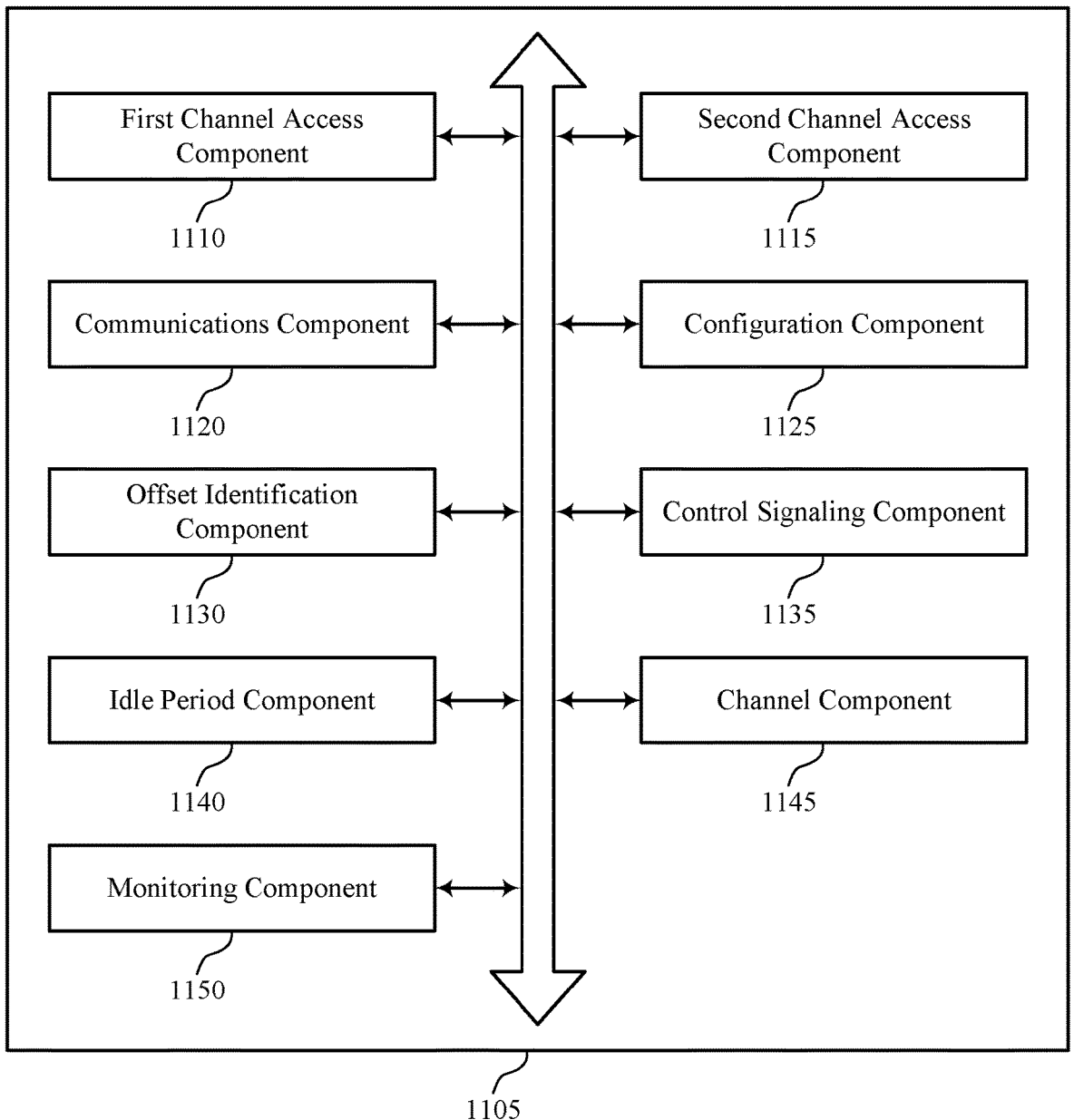
FIG. 11 shows a block diagram of a communications manager that supports IAB node techniques for unlicensed operations in accordance with aspects of the present disclosure.

FIG. 11 shows a block diagram 1100 of a communications manager 1105 that supports integrated access and backhaul node techniques for unlicensed operations in accordance with aspects of the present disclosure. The communications manager 1105 may be an example of aspects of a communications manager 915, a communications manager 1015, or a communications manager 1210 described herein. The communications manager 1105 may include a first channel access component 1110, a second channel access component 1115, a communications component 1120, a configuration component 1125, an offset identification component 1130, a control signaling component 1135, an idle period component 1140, a channel component 1145, and a monitoring component 1150. Each of these modules may communicate, directly or indirectly, with one another (e.g., via one or more buses).

The first channel access component 1110 may perform a first channel access procedure for a first fixed frame period associated with the first component. In some examples, the first channel access component 1110 may perform the first channel access procedure for the first component in accordance with a first access mode.

The second channel access component 1115 may perform a second channel access procedure for a second fixed frame period associated with the second component, the second fixed frame period staggered in time with respect to the first fixed frame period in accordance with an offset. In some examples, the second channel access component 1115 may perform the second channel access procedure for the second component in accordance with a second access mode. In some cases, the first access mode is different from the second access mode. In some cases, the first access mode is the same as the second access mode. In some cases, the first access mode, the second access mode, or both include a dynamic access mode, a semi-static access mode, or a combination thereof. In some cases, the first component includes a mobile terminal component and the second component includes a distributed unit component.

The communications component 1120 may communicate with one or more wireless devices during a first channel occupancy time associated with the first fixed frame period, during a second channel occupancy time associated with the second fixed frame period, or a combination thereof based on performing the first channel access procedure and the second channel access procedure.

The configuration component 1125 may identify a configuration for the integrated access and backhaul node, the configuration indicating one or more parameters associated with the first fixed frame period, the second fixed frame period, or both. In some cases, the one or more parameters include a starting time for the first fixed frame period, a starting time for the second fixed frame period, a duration of the first fixed frame period, a duration of the second fixed frame period, or any combination thereof.

The offset identification component 1130 may identify the offset between the first fixed frame period and the second fixed frame period based on the identified configuration, where the second fixed frame period staggered in time with respect to the first fixed frame period in accordance with the identified offset.

The control signaling component 1135 may receive, from an integrated access and backhaul donor node, control signaling indicating the configuration.

The idle period component 1140 may transmit, by the first component, communications during an idle period of the second fixed frame period associated with the second component. In some examples, the idle period component 1140 may transmit, by the second component, communications during an idle period of the first fixed frame period associated with the first component. In some examples, the idle period component 1140 may refrain from communicating at the first component during an idle period of the second fixed frame period associated with the second component. In some examples, the idle period component 1140 may refrain from communicating at the second component during an idle period of the first fixed frame period associated with the first component.

In some cases, a second idle period of the second fixed frame period associated with the second component includes the idle period of the first fixed frame period. In some cases, the second idle period begins at a same time as the beginning of the idle period of the first fixed frame period, and where a channel occupancy time of the second fixed frame period is smaller than a channel occupancy time of the first fixed frame period.

The channel component 1145 may determine that the second component failed to obtain a channel during the second fixed frame period, where transmitting the communications is based on the determining. In some examples, the channel component 1145 may determine that the first component failed to obtain a channel during the first fixed frame period, where transmitting the communications is based on the determining. In some examples, the channel component 1145 may determine that the second component is communicating during the second fixed frame period, where refraining from communicating at the first component is based on the determining. In some examples, the channel component 1145 may determine that the first component is communicating during the first fixed frame period, where refraining from communicating at the second component is based on the determining.

The monitoring component 1150 may monitor one or more channels for a time period, where communicating with the one or more wireless devices is based on the monitoring. In some cases, the first channel access procedure, the second channel access procedure, or both include a single slot listen before talk procedure.

In some cases, the communications manager 1105, the first channel access component 1110, the second channel access component 1115, the communications component 1120, the configuration component 1125, the offset identification component 1130, the control signaling component 1135, the idle period component 1140, the channel component 1145, and the monitoring component 1150 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the communications manager 1105, the first channel access component 1110, the second channel access component 1115, the communications component 1120, the configuration component 1125, the offset identification component 1130, the control signaling component 1135, the idle period component 1140, the channel component 1145, and the monitoring component 1150 discussed herein.

Figure 12:
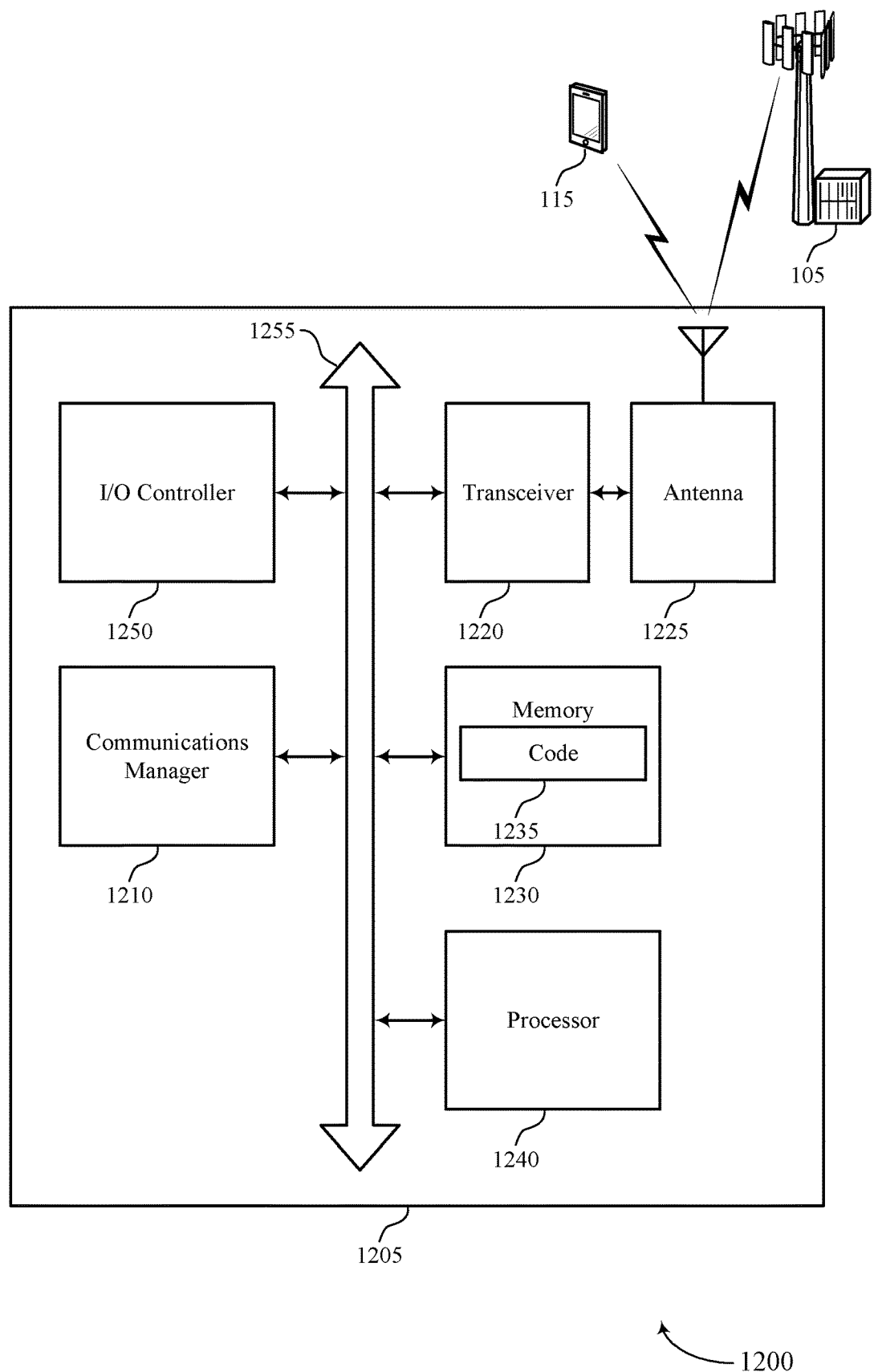
FIG. 12 shows a diagram of a system including a user equipment (UE) that supports IAB node techniques for unlicensed operations in accordance with aspects of the present disclosure.

FIG. 12 shows a diagram of a system 1200 including a device 1205 that supports integrated access and backhaul node techniques for unlicensed operations in accordance with aspects of the present disclosure. The device 1205 may be an example of or include the components of a device 905, a device 1005, an IAB node, or a UE 115 (e.g., DU component) as described herein. The device 1205 may include components for bi-directional voice and data communications including components for transmitting and receiving communications, including a communications manager 1210, a transceiver 1220, an antenna 1225, memory 1230, a processor 1240, and an I/O controller 1250. These components may be in electronic communication via one or more buses (e.g., bus 1255).

The communications manager 1210 may perform a first channel access procedure for a first fixed frame period associated with the first component, perform a second channel access procedure for a second fixed frame period associated with the second component, the second fixed frame period staggered in time with respect to the first fixed frame period in accordance with an offset, and communicate with one or more wireless devices during a first channel occupancy time associated with the first fixed frame period, during a second channel occupancy time associated with the second fixed frame period, or a combination thereof based on performing the first channel access procedure and the second channel access procedure.

Transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a basic input/output system (BIOS) which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting integrated access and backhaul node techniques for unlicensed operations).

The I/O controller 1250 may manage input and output signals for the device 1205. The I/O controller 1250 may also manage peripherals not integrated into the device 1205. In some cases, the I/O controller 1250 may represent a physical connection or port to an external peripheral. In some cases, the I/O controller 1250 may utilize an operating system such as iOS®, ANDROID®, MS-DOS®, MS-WINDOWS®, OS/2®, UNIX®, LINUX®, or another known operating system. In other cases, the I/O controller 1250 may represent or interact with a modem, a keyboard, a mouse, a touchscreen, or a similar device. In some cases, the I/O controller 1250 may be implemented as part of a processor. In some cases, a user may interact with the device 1205 via the I/O controller 1250 or via hardware components controlled by the I/O controller 1250.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
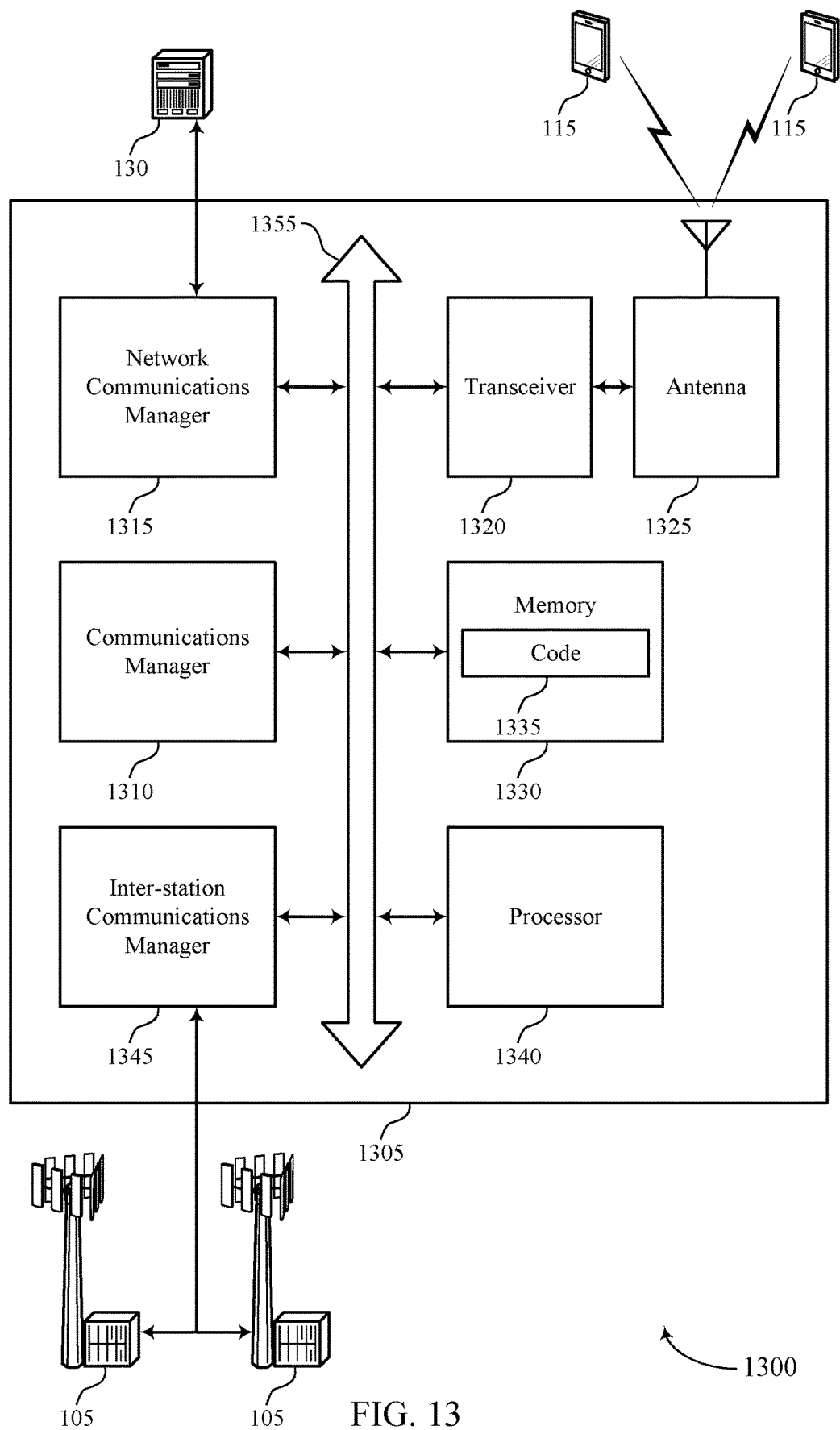
FIG. 13 shows a diagram of a system including a base station that supports IAB node techniques for unlicensed operations in accordance with aspects of the present disclosure.

FIG. 13 shows a diagram of a system 1300 including a device 1305 that supports integrated access and backhaul node techniques for unlicensed operations in accordance with aspects of the present disclosure. The device 1305 may be an example of or include the components of a device 905, a device 1005, an IAB node, or a base station 105 (e.g., MT component) as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1355).

The communications manager 1310 may perform a first channel access procedure for a first fixed frame period associated with the first component, perform a second channel access procedure for a second fixed frame period associated with the second component, the second fixed frame period staggered in time with respect to the first fixed frame period in accordance with an offset, and communicate with one or more wireless devices during a first channel occupancy time associated with the first fixed frame period, during a second channel occupancy time associated with the second fixed frame period, or a combination thereof based on performing the first channel access procedure and the second channel access procedure.

Network communications manager 1315 may manage communications with the core network (e.g., via one or more wired backhaul links). For example, the network communications manager 1315 may manage the transfer of data communications for client devices, such as one or more UEs 115.

Transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting integrated access and backhaul node techniques for unlicensed operations).

Inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
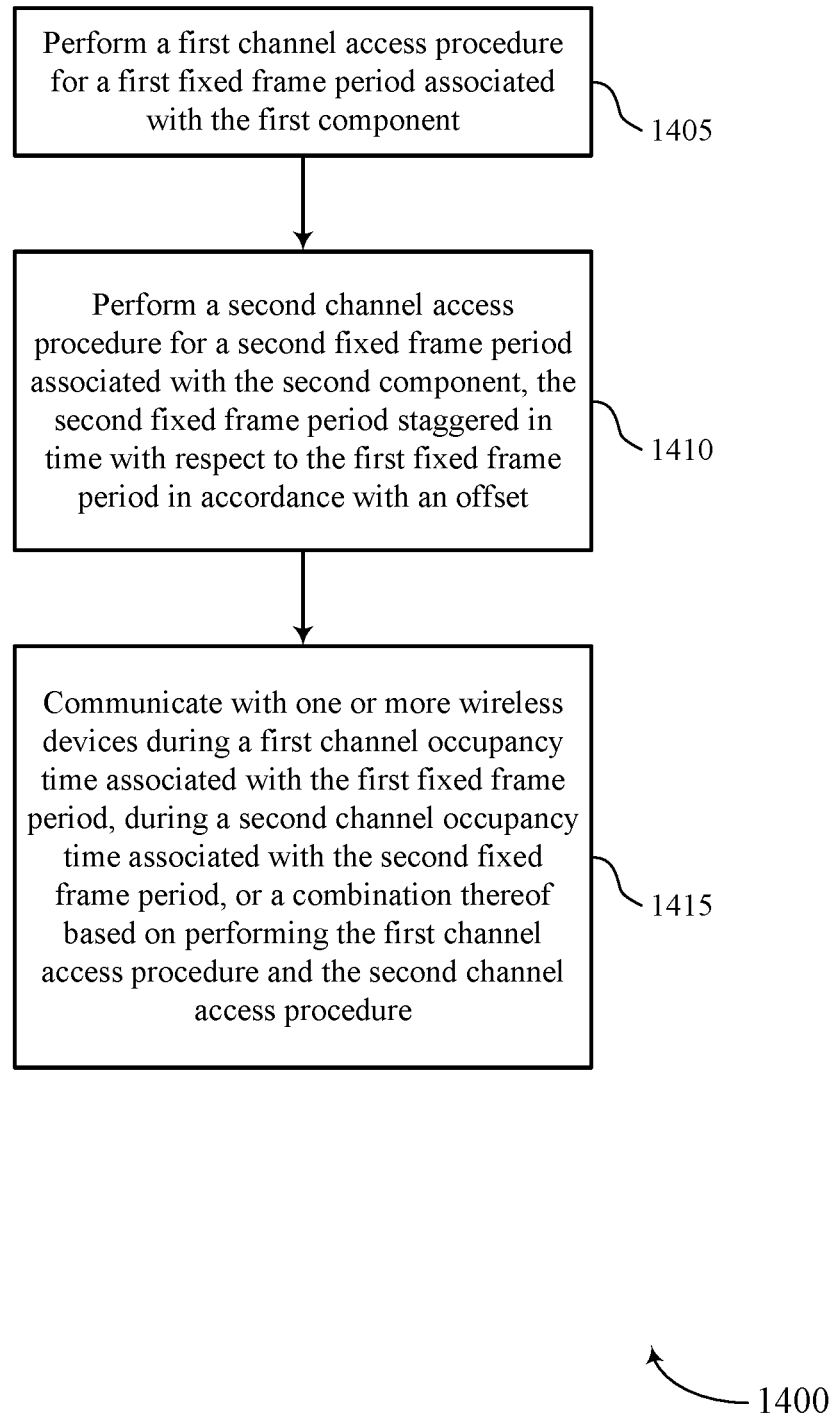
FIGS. 14 and 15 show flowcharts illustrating methods that support IAB node techniques for unlicensed operations in accordance with aspects of the present disclosure.

FIG. 14 shows a flowchart illustrating a method 1400 that supports integrated access and backhaul node techniques for unlicensed operations in accordance with aspects of the present disclosure. The operations of method 1400 may be implemented by an IAB node, a UE 115 (e.g., DU component), or a base station 105 (e.g., MT component) or its components as described herein. For example, the operations of method 1400 may be performed by a communications manager as described with reference to FIGS. 9 through 13. In some examples, a UE or base station may execute a set of instructions to control the functional elements of the UE or base station to perform the functions described below. Additionally or alternatively, a UE or base station may perform aspects of the functions described below using special-purpose hardware.

At 1405, the UE or base station may perform a first channel access procedure for a first fixed frame period associated with the first component. The operations of 1405 may be performed according to the methods described herein. In some examples, aspects of the operations of 1405 may be performed by a first channel access component as described with reference to FIGS. 9 through 13.

At 1410, the UE or base station may perform a second channel access procedure for a second fixed frame period associated with the second component, the second fixed frame period staggered in time with respect to the first fixed frame period in accordance with an offset. The operations of 1410 may be performed according to the methods described herein. In some examples, aspects of the operations of 1410 may be performed by a second channel access component as described with reference to FIGS. 9 through 13.

At 1415, the UE or base station may communicate with one or more wireless devices during a first channel occupancy time associated with the first fixed frame period, during a second channel occupancy time associated with the second fixed frame period, or a combination thereof based on performing the first channel access procedure and the second channel access procedure. The operations of 1415 may be performed according to the methods described herein. In some examples, aspects of the operations of 1415 may be performed by a communications component as described with reference to FIGS. 9 through 13.

Figure 15:
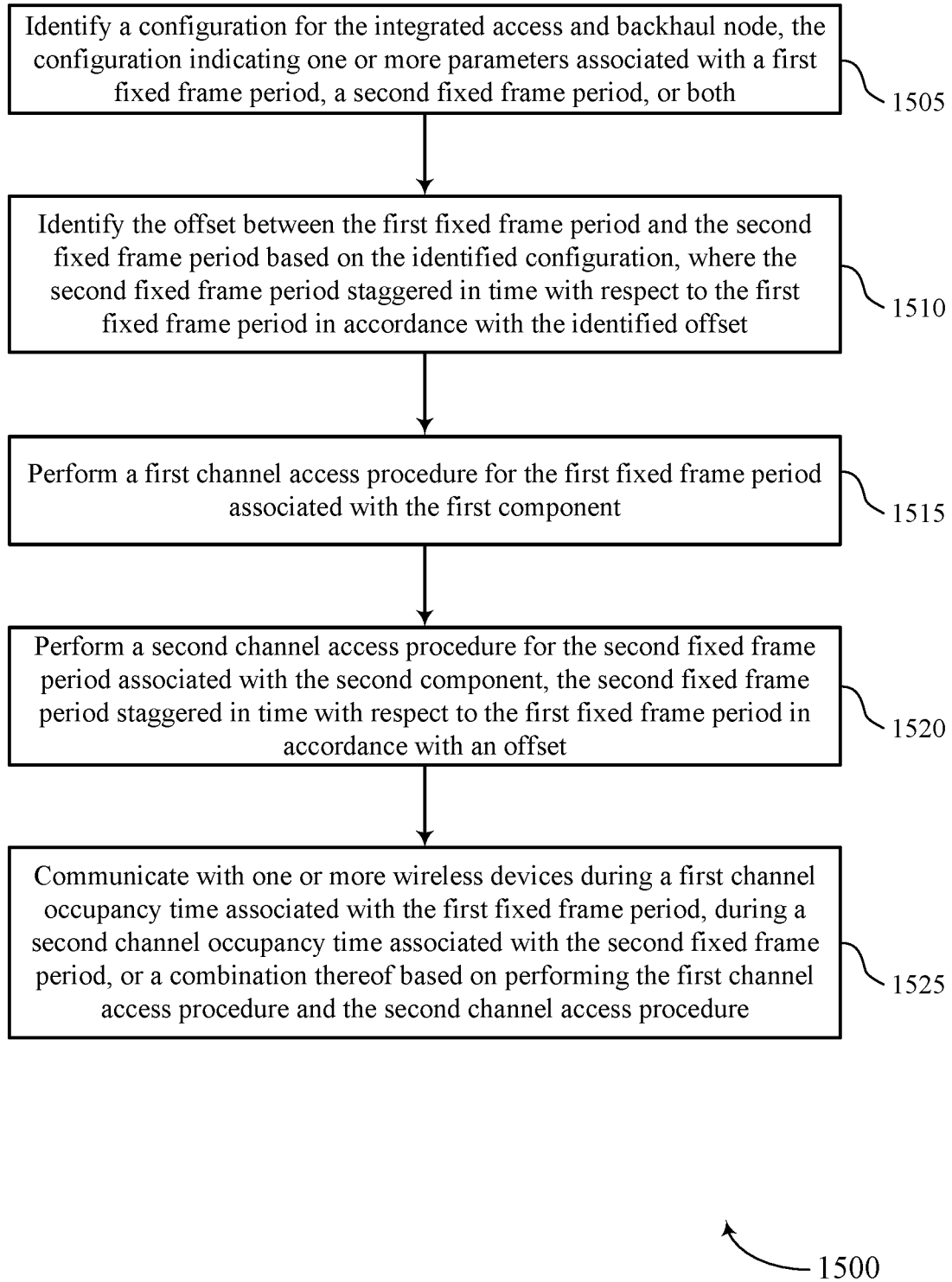

FIG. 15 shows a flowchart illustrating a method 1500 that supports integrated access and backhaul node techniques for unlicensed operations in accordance with aspects of the present disclosure. The operations of method 1500 may be implemented by an IAB node, a UE 115 (e.g., DU component), or a base station 105 (e.g., MT component) or its components as described herein. For example, the operations of method 1500 may be performed by a communications manager as described with reference to FIGS. 9 through 13. In some examples, a UE or base station may execute a set of instructions to control the functional elements of the UE or base station to perform the functions described below. Additionally or alternatively, a UE or base station may perform aspects of the functions described below using special-purpose hardware.

At 1505, the UE or base station may identify a configuration for the integrated access and backhaul node, the configuration indicating one or more parameters associated with a first fixed frame period, a second fixed frame period, or both. The operations of 1505 may be performed according to the methods described herein. In some examples, aspects of the operations of 1505 may be performed by a configuration component as described with reference to FIGS. 9 through 13.

At 1510, the UE or base station may identify the offset between the first fixed frame period and the second fixed frame period based on the identified configuration, where the second fixed frame period staggered in time with respect to the first fixed frame period in accordance with the identified offset. The operations of 1510 may be performed according to the methods described herein. In some examples, aspects of the operations of 1510 may be performed by an offset identification component as described with reference to FIGS. 9 through 13.

At 1515, the UE or base station may perform a first channel access procedure for the first fixed frame period associated with the first component. The operations of 1515 may be performed according to the methods described herein. In some examples, aspects of the operations of 1515 may be performed by a first channel access component as described with reference to FIGS. 9 through 13.

At 1520, the UE or base station may perform a second channel access procedure for the second fixed frame period associated with the second component, the second fixed frame period staggered in time with respect to the first fixed frame period in accordance with an offset. The operations of 1520 may be performed according to the methods described herein. In some examples, aspects of the operations of 1520 may be performed by a second channel access component as described with reference to FIGS. 9 through 13.

At 1525, the UE or base station may communicate with one or more wireless devices during a first channel occupancy time associated with the first fixed frame period, during a second channel occupancy time associated with the second fixed frame period, or a combination thereof based on performing the first channel access procedure and the second channel access procedure. The operations of 1525 may be performed according to the methods described herein. In some examples, aspects of the operations of 1525 may be performed by a communications component as described with reference to FIGS. 9 through 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at an integrated access and backhaul node comprising a first component for communications with at least a parent node and a second component for communications with at least a child node, comprising: performing a first channel access procedure for a first fixed frame period associated with the first component; performing a second channel access procedure for a second fixed frame period associated with the second component, the second fixed frame period staggered in time with respect to the first fixed frame period in accordance with an offset; and communicating with one or more wireless devices during a first channel occupancy time associated with the first fixed frame period, during a second channel occupancy time associated with the second fixed frame period, or a combination thereof based at least in part on performing the first channel access procedure and the second channel access procedure.

Aspect 2: The method of aspect 1, further comprising: identifying a configuration for the integrated access and backhaul node, the configuration indicating one or more parameters associated with the first fixed frame period, the second fixed frame period, or both; and identifying the offset between the first fixed frame period and the second fixed frame period based at least in part on the identified configuration, wherein the second fixed frame period staggered in time with respect to the first fixed frame period in accordance with the identified offset.

Aspect 3: The method of aspect 2, further comprising: receiving, from an integrated access and backhaul donor node, control signaling indicating the configuration.

Aspect 4: The method of any of aspects 2 through 3, wherein the one or more parameters comprise a starting time for the first fixed frame period, a starting time for the second fixed frame period, a duration of the first fixed frame period, a duration of the second fixed frame period, or any combination thereof.

Aspect 5: The method of any of aspects 1 through 4, further comprising: transmitting, by the first component, communications during an idle period of the second fixed frame period associated with the second component.

Aspect 6: The method of aspect 5, further comprising: determining that the second component failed to obtain a channel during the second fixed frame period, wherein transmitting the communications is based at least in part on the determining.

Aspect 7: The method of any of aspects 1 through 6, further comprising: transmitting, by the second component, communications during an idle period of the first fixed frame period associated with the first component.

Aspect 8: The method of aspect 7, further comprising: determining that the first component failed to obtain a channel during the first fixed frame period, wherein transmitting the communications is based at least in part on the determining.

Aspect 9: The method of any of aspects 1 through 8, further comprising: refraining from communicating at the first component during an idle period of the second fixed frame period associated with the second component.

Aspect 10: The method of aspect 9, further comprising: determining that the second component is communicating during the second fixed frame period, wherein refraining from communicating at the first component is based at least in part on the determining.

Aspect 11: The method of any of aspects 1 through 10, further comprising: refraining from communicating at the second component during an idle period of the first fixed frame period associated with the first component.

Aspect 12: The method of aspect 11, further comprising: determining that the first component is communicating during the first fixed frame period, wherein refraining from communicating at the second component is based at least in part on the determining.

Aspect 13: The method of any of aspects 11 through 12, wherein a second idle period of the second fixed frame period associated with the second component comprises the idle period of the first fixed frame period.

Aspect 14: The method of aspect 13, wherein the second idle period begins at a same time as the beginning of the idle period of the first fixed frame period, and a channel occupancy time of the second fixed frame period is smaller than a channel occupancy time of the first fixed frame period.

Aspect 15: The method of any of aspects 1 through 14, further comprising: performing the first channel access procedure for the first component in accordance with a first access mode; and performing the second channel access procedure for the second component in accordance with a second access mode.

Aspect 16: The method of aspect 15, wherein the first access mode is different from the second access mode.

Aspect 17: The method of any of aspects 15 through 16, wherein the first access mode is the same as the second access mode.

Aspect 18: The method of any of aspects 15 through 17, wherein the first access mode, the second access mode, or both comprise a dynamic access mode, a semi-static access mode, or a combination thereof.

Aspect 19: The method of any of aspects 1 through 18, wherein performing the first channel access procedure, the second channel access procedure, or both comprises: monitoring one or more channels for a time period, wherein communicating with the one or more wireless devices is based at least in part on the monitoring.

Aspect 20: The method of aspect 19, wherein the first channel access procedure, the second channel access procedure, or both comprise a single slot listen before talk procedure.

Aspect 21: The method of any of aspects 1 through 20, wherein the first component comprises a mobile terminal component and the second component comprises a distributed unit component.

Aspect 22: An apparatus for wireless communications at an integrated access and backhaul node comprising a first component for communications with at least a parent node and a second component for communications with at least a child node, comprising a processor; memory coupled with the processor; and instructions stored in the memory and executable by the processor to cause the apparatus to perform a method of any of aspects 1 through 21.

Aspect 23: An apparatus for wireless communications at an integrated access and backhaul node comprising a first component for communications with at least a parent node and a second component for communications with at least a child node, comprising at least one means for performing a method of any of aspects 1 through 21.

Aspect 24: A non-transitory computer-readable medium storing code for wireless communications at an integrated access and backhaul node comprising a first component for communications with at least a parent node and a second component for communications with at least a child node, the code comprising instructions executable by a processor to perform a method of any of aspects 1 through 21.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at an integrated access and backhaul node comprising a first component for communications with at least a first node and a second component for communications with at least a second node, comprising:
    performing a first channel access procedure for a first fixed frame period associated with the first component;
    performing a second channel access procedure for a second fixed frame period associated with the second component, the second fixed frame period staggered in time with respect to the first fixed frame period in accordance with an offset;
    communicating with one or more wireless devices during a first channel occupancy time associated with the first fixed frame period, during a second channel occupancy time associated with the second fixed frame period, or a combination thereof based at least in part on performing the first channel access procedure and the second channel access procedure; and
    determining whether to transmit, by the first component, communications during an idle period of the second fixed frame period associated with the second component based at least in part on whether the second component obtained a channel during the second fixed frame period.

2. The method of claim 1, further comprising:
    identifying a configuration for the integrated access and backhaul node, the configuration indicating one or more parameters associated with the first fixed frame period, the second fixed frame period, or both; and
    identifying the offset between the first fixed frame period and the second fixed frame period based at least in part on the identified configuration, wherein the second fixed frame period staggered in time with respect to the first fixed frame period in accordance with the identified offset.

3. The method of claim 2, further comprising:
    receiving, from an integrated access and backhaul donor node, control signaling indicating the configuration.

4. The method of claim 2, wherein the one or more parameters comprise a starting time for the first fixed frame period, a starting time for the second fixed frame period, a duration of the first fixed frame period, a duration of the second fixed frame period, or any combination thereof.

5. The method of claim 1, wherein determining whether to transmit the communications during the idle period comprises:
    transmitting, by the first component, the communications during the idle period of the second fixed frame period associated with the second component based at least in part on the second component failing to obtain the channel during the second fixed frame period.

6. The method of claim 1, wherein the first node comprises a parent node, and wherein the second node comprises a child node.

7. The method of claim 1, wherein the first node comprises a child node, and wherein the second node comprises a parent node.

8. The method of claim 1, wherein determining whether to transmit the communications during the idle period comprises:
    refraining from transmitting the communications during the idle period of the second fixed frame period associated with the second component based at least in part on the second component obtaining the channel during the second fixed frame period.

9. The method of claim 8, further comprising:
    determining that the second component is communicating during the second fixed frame period, wherein the second component obtaining the channel is based at least in part on the determining.

10. The method of claim 8, wherein a second idle period of the first fixed frame period associated with the first component comprises the idle period of the second fixed frame period.

11. The method of claim 10, wherein the second idle period begins at a same time as the beginning of the idle period of the second fixed frame period, and wherein a channel occupancy time of the first fixed frame period is smaller than a channel occupancy time of the second fixed frame period.

12. The method of claim 1, further comprising:
    performing the first channel access procedure for the first component in accordance with a first access mode; and
    performing the second channel access procedure for the second component in accordance with a second access mode.

13. The method of claim 12, wherein the first access mode is different from the second access mode.

14. The method of claim 12, wherein the first access mode is the same as the second access mode.

15. The method of claim 12, wherein the first access mode, the second access mode, or both comprise a dynamic access mode, a semi-static access mode, or a combination thereof.

16. The method of claim 1, wherein performing the first channel access procedure, the second channel access procedure, or both comprises:
monitoring one or more channels for a time period, wherein communicating with the one or more wireless devices is based at least in part on the monitoring.

17. The method of claim 16, wherein the first channel access procedure, the second channel access procedure, or both comprise a single slot listen before talk procedure.

18. The method of claim 1, wherein the first component comprises a mobile terminal component and the second component comprises a distributed unit component.

19. An apparatus for wireless communications at an integrated access and backhaul node comprising a first component for communications with at least a first node and a second component for communications with at least a second node, comprising:
a processor,
memory coupled with the processor; and
instructions stored in the memory and executable by the processor to cause the apparatus to:
perform a first channel access procedure for a first fixed frame period associated with the first component;
perform a second channel access procedure for a second fixed frame period associated with the second component, the second fixed frame period staggered in time with respect to the first fixed frame period in accordance with an offset;
communicate with one or more wireless devices during a first channel occupancy time associated with the first fixed frame period, during a second channel occupancy time associated with the second fixed frame period, or a combination thereof based at least in part on performing the first channel access procedure and the second channel access procedure; and
determine whether to transmit, by the first component, communications during an idle period of the second fixed frame period associated with the second component based at least in part on whether the second component obtained a channel during the second fixed frame period.

20. The apparatus of claim 19, wherein the instructions are further executable by the processor to cause the apparatus to:
identify a configuration for the integrated access and backhaul node, the configuration indicating one or more parameters associated with the first fixed frame period, the second fixed frame period, or both; and
identify the offset between the first fixed frame period and the second fixed frame period based at least in part on the identified configuration, wherein the second fixed frame period staggered in time with respect to the first fixed frame period in accordance with the identified offset.

21. The apparatus of claim 20, wherein the instructions are further executable by the processor to cause the apparatus to:
receive, from an integrated access and backhaul donor node, control signaling indicating the configuration.

22. The apparatus of claim 20, wherein the one or more parameters comprise a starting time for the first fixed frame period, a starting time for the second fixed frame period, a duration of the first fixed frame period, a duration of the second fixed frame period, or any combination thereof.

23. The apparatus of claim 19, wherein, to determine whether to transmit the communications during the idle period, the instructions are executable by the processor to cause the apparatus to:
transmit, by the first component, the communications during the idle period of the second fixed frame period associated with the second component based at least in part on the second component failing to obtain the channel during the second fixed frame period.

24. The apparatus of claim 19, wherein, to determine whether to transmit the communications during the idle period, the instructions are executable by the processor to cause the apparatus to:
refrain from transmitting, by the first component, the communications during the idle period of the second fixed frame period associated with the second component based at least in part on the second component obtaining the channel during the second fixed frame period.

25. An apparatus for wireless communications at an integrated access and backhaul node comprising a first component for communications with at least a first node and a second component for communications with at least a second node, comprising:
means for performing a first channel access procedure for a first fixed frame period associated with the first component;
means for performing a second channel access procedure for a second fixed frame period associated with the second component, the second fixed frame period staggered in time with respect to the first fixed frame period in accordance with an offset;
means for communicating with one or more wireless devices during a first channel occupancy time associated with the first fixed frame period, during a second channel occupancy time associated with the second fixed frame period, or a combination thereof based at least in part on performing the first channel access procedure and the second channel access procedure; and
means for determining whether to transmit, by the first component, communications during an idle period of the second fixed frame period associated with the second component based at least in part on whether the second component obtained a channel during the second fixed frame period.

26. A non-transitory computer-readable medium storing code for wireless communications at an integrated access and backhaul node comprising a first component for communications with at least a first node and a second component for communications with at least a second node, the code comprising instructions executable by a processor to:
perform a first channel access procedure for a first fixed frame period associated with the first component;
perform a second channel access procedure for a second fixed frame period associated with the second component, the second fixed frame period staggered in time with respect to the first fixed frame period in accordance with an offset;
communicate with one or more wireless devices during a first channel occupancy time associated with the first fixed frame period, during a second channel occupancy time associated with the second fixed frame period, or a combination thereof based at least in part on performing the first channel access procedure and the second channel access procedure; and determine whether to transmit, by the first component, communications during an idle period of the second fixed frame period associated with the second component based at least in part on whether the second component obtained a channel during the second fixed frame period.

* * * * *